(12) United States Patent
Ferrari et al.

(10) Patent No.: US 7,565,418 B2
(45) Date of Patent: Jul. 21, 2009

(54) NETWORK DEVICE SETUP UTILITY

(75) Inventors: Justin Ferrari, Seattle, WA (US); Nick Holt, Seattle, WA (US); Ryan Peterson, Seattle, WA (US); Aaron Averbuch, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 388 days.

(21) Appl. No.: 11/457,763

(22) Filed: Jul. 14, 2006

(65) Prior Publication Data

US 2007/0111568 A1 May 17, 2007

Related U.S. Application Data

(63) Continuation-in-part of application No. 11/297,809, filed on Dec. 7, 2005.

(60) Provisional application No. 60/634,432, filed on Dec. 7, 2004.

(51) Int. Cl.
*G06F 15/177* (2006.01)
(52) U.S. Cl. ...................... 709/220; 709/224
(58) Field of Classification Search ......... 709/220–222, 709/224; 715/705–715, 734–736
See application file for complete search history.

(56) References Cited

U.S. PATENT DOCUMENTS

| | | | |
|---|---|---|---|
| 7,080,141 B1* | 7/2006 | Baekelmans et al. | 709/224 |
| 7,240,106 B2* | 7/2007 | Cochran et al. | 709/222 |
| 7,340,512 B2* | 3/2008 | Cochran et al. | 709/220 |
| 2002/0161865 A1* | 10/2002 | Nguyen | 709/220 |
| 2002/0161867 A1* | 10/2002 | Cochran et al. | 709/221 |
| 2003/0069947 A1* | 4/2003 | Lipinski | 709/220 |
| 2005/0149626 A1* | 7/2005 | Manchester et al. | 709/220 |
| 2006/0277299 A1* | 12/2006 | Baekelmans et al. | 709/224 |
| 2007/0022185 A1* | 1/2007 | Hamilton et al. | 709/220 |
| 2007/0268506 A1* | 11/2007 | Zeldin | 358/1.13 |
| 2007/0268515 A1* | 11/2007 | Freund et al. | 358/1.15 |
| 2007/0268516 A1* | 11/2007 | Bugwadia et al. | 358/1.15 |

\* cited by examiner

*Primary Examiner*—Kenneth R Coulter
(74) *Attorney, Agent, or Firm*—Patent Capital Group

(57) ABSTRACT

A network device setup utility gathers network configuration information at a computing device, displays network-device-installation instructions; and configures the network device by sending the gathered network configuration information from the computing device to the network device. The gathered network configuration information may include a type of Internet connection, such as DHCP, static IP, dynamic PPPoE, or Static PPPoE. The gathered network configuration information includes an Internet Service Provider account name and password. The network-device-installation instructions may include a customizable graphical depiction of the network device and may provide ordered step-by-step instructions for connecting a network cable and a power cable to the network device. Configuring the network device, which may be a router, may include confirming Internet connectivity.

28 Claims, 30 Drawing Sheets

NETWORK DEVICE SETUP UTILITY

RELATED APPLICATIONS

This application claims priority to U.S. patent application Ser. No. 11/297,809 filed on Dec. 7, 2005, entitled "Network Management" and naming Steve Bush et al. as inventors, which application in turn claims priority to U.S. Provisional Patent Application No. 60/634,432, filed Dec. 7, 2004, entitled "Network Management" and naming Steve Bush et al. as inventors, which applications are both incorporated entirely herein by reference.

FIELD OF THE INVENTION

Embodiments of the invention are directed to a network device setup utility that gathers network configuration information and configures a network device with the gathered network configuration information.

BACKGROUND OF THE INVENTION

Computing devices have become commonplace tools in modern society, and even many small businesses and families now have one or more computing devices. In a small business, for example, multiple employees may use a computer, such as a desktop computer, laptop computer, personal digital assistant or "smart" wireless telephone. When a family shares a single residence, one or more family members may have a computer. Further, both businesses and personal residences may additionally employ one or more various computing appliances that incorporate or otherwise interact with computers. For example, a family member may use a digital music player, a printer, a refrigerator, a "Voice over Internet Protocol" telephone, a digital music server, a digital camera, or even an environmental control system that includes or otherwise interacts with a computer.

In order to optimize the use and flexibility of these computing devices, a business or family may link them together to form a small private network. Typically, each of the computing devices is connected to a router through a network adapter. The router then "routes" packets of data to and from each computing device. With this type of small private network, the router can in turn be connected to one or more larger private or public networks, such as the Internet. By sending and receiving messages through the router, each networked computing device may then communicate with computing devices outside of the private network. In this arrangement, the router serves as a "gateway" device that provides a gateway to outside of the private network.

While this type of small or "home" network can provide enhanced utility for its member computing devices, even a small network can be very difficult for a non-technical person to set up and maintain. Accordingly, simplifying network device setup would be desirable.

BRIEF SUMMARY OF THE INVENTION

Embodiments of the invention relate to a network device setup utility that gathers network configuration information at a computing device, displays installation instructions for the network device, and configures the network device by sending the gathered network configuration information from the computing device to the network device. The gathered network configuration information may include, for example the type of Internet connection that will be employed by the network device,. The gathered network configuration information also may include an Internet Service Provider account name and password that will be employed by the network device. The network device installation instructions may then include a customizable graphical depiction of the network device and may provide ordered step-by-step instructions for connecting a network cable and a power cable to the network device. Configuring the network device, which may be a router, may include confirming Internet connectivity.

BRIEF DESCRIPTION OF THE DRAWINGS

The foregoing Brief Summary, as well as the following Detailed Description, is better understood when read in conjunction with the accompanying drawings, which are included by way of example, and not by way of limitation, with regard to the claimed invention.

DETAILED DESCRIPTION OF THE INVENTION

Forms of Implementation

As will be appreciated by those of ordinary skill in the art, some examples of the invention may be implemented by preconfigured analog or digital circuitry. More typically, however, examples of the invention will be implemented by a programmable computing device executing software instructions. In particular, various examples of the invention will be implemented by a programmable computing device executing software instructions according to a communication protocol such as, e.g., the Simple Object Access Protocol (SOAP). The computing device may be a computer or computing appliance that is incorporated in the network device providing or receiving the information. For example, as will be discussed in more detail below, various examples of the invention may be implemented as a component of a computer, a router (also known as a gateway or residential gateway), digital photo hardware, a video camera, a media adapter, or a printer.

Network Environment

Figure 1:
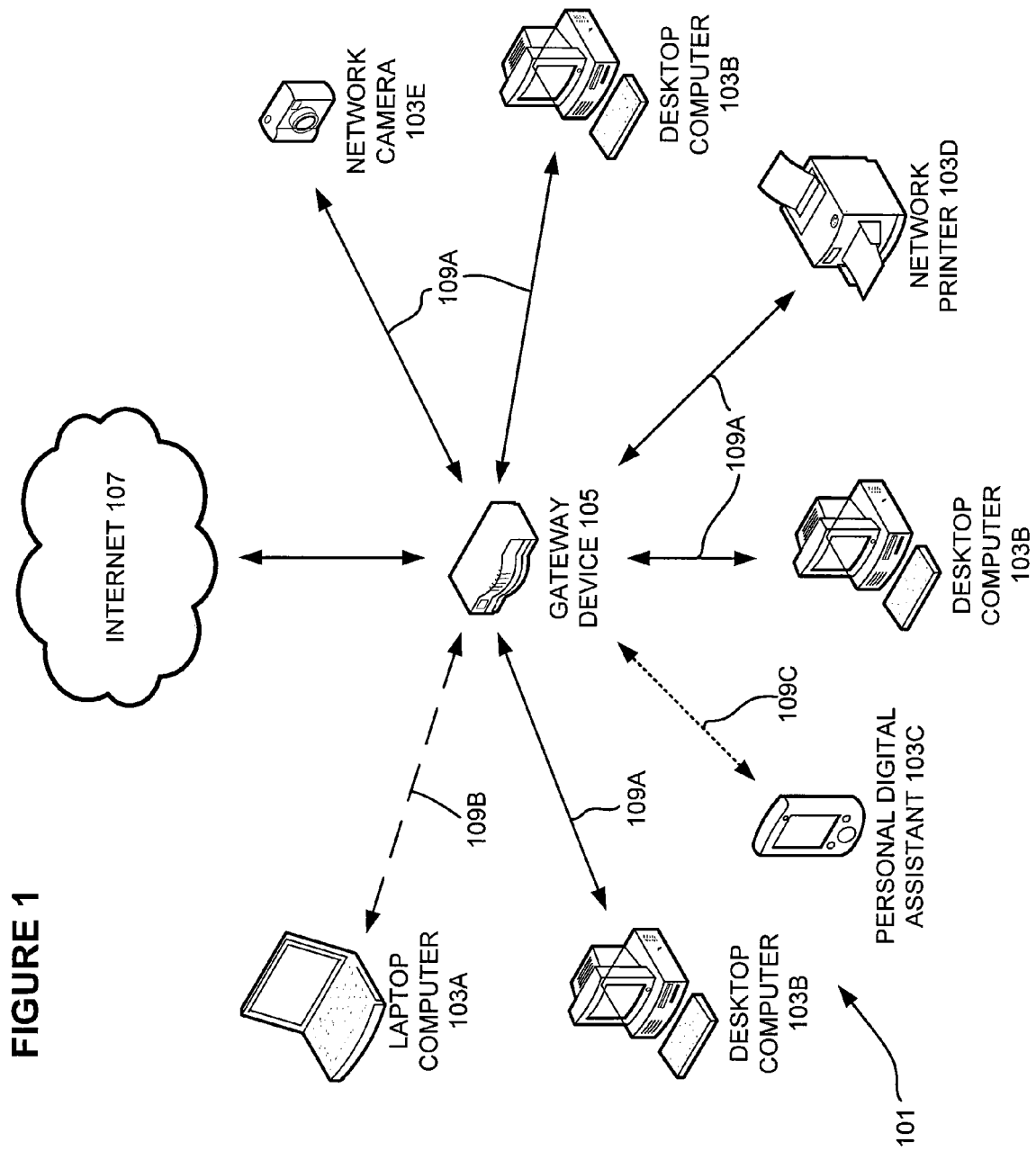
FIG. 1 shows an exemplary network environment within which embodiments of the invention may be implemented.

As previously noted, various examples of the invention may be employed within a small network. FIG. 1 illustrates an example of this type of small network. The network 101 may include a variety of different computing devices or "nodes". For example, the network 101 may include one or more multipurpose computers 103, such as laptop computer 103A, desktop computers 103B, and personal digital assistant 103C. In addition to these computers, the network 101 may also include one or more computing appliances, which typically are not as versatile as conventional multipurpose computers, but which nonetheless may be configured to exchange data over a network. Such computing appliances may include, for example, network printers 103D, cameras 103E, and other special-purpose computing devices, such as telephones that exchange voice information in data packets (sometimes generically referred to as "Voice over Internet Protocol (VoIP) telephones), digital video recorders, televisions, media adapters, media players, and digital music servers, among others.

The network appliances in the network 101 will typically include a gateway device 105, through which each of the networked devices 103 communicates, either directly or indirectly. In turn, the gateway device 105 typically will communicate with one or more devices outside of the network 101. For example, the gateway device 105 may communicate with another private network, a public network, such as the Internet 107, or both. Thus, the gateway device 105 is a device that can direct electronic data from one network to another network. Typically, the gateway device 105 serves as a node on two incompatible networks (i.e., networks that use different communication protocol formats) and it will convert data from one network's communication protocol format into the other network's communication protocol format. As used herein, the term "small network" refers to a network made up of networked devices 103 that each employ the same network address to communicate with a single gateway device 105, together with the gateway device 105 itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 109B is connected to the gateway device 105 through a IEEE 802.11 wireless connection and the personal digital assistant 103C is connected to the gateway device 105 through a Bluetooth wireless connection.

It should be appreciated that, as used throughout this application, the term "connect" and its derivatives (e.g., connection, connected, connects) include both direct and indirect connections. Thus, with the network illustrated in FIG. 1, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 will be a router. As will be appreciated by those of ordinary skill in the art, a router routes data packets from the networked devices 103 to one or more device outside of the network 101, and vice versa. With some networks, however, the gateway device 105 alternately may be a computer performing router functions, a hub, a bridge, or a "layer-3" switch. As will also be appreciated by those of ordinary skill in the art, the computing devices or "nodes" making up the network 101 will communicate with the gateway device 105 using one or more defined communication protocols, such as the Transmission Control Protocol (TCP) and the Internet Protocol (IP).

With these communication protocols, each computing device 103 and gateway device 105 in the network 101 will be assigned a logical address. For example, if the network 101 is connected to the Internet 107 through an Internet service provider, the Internet service provider will assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device typically also will have a physical address. For example, most computing devices capable of communicating over a network, including routers, employ a network adapter with a media access control (MAC) address. This type of physical address is assigned to a network interface of a computing device, referred to as a "network adapter," according to standards set forth by the Institute of Electrical and Electronic Engineers (IEEE) (referred to as "Project 802" or simply "802" standards, which are incorporated entirely herein by reference). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

Network Devices

A network may include both virtual devices and physical devices. Physical network devices will then incorporate a computer, a computing appliance, or both. As previously noted, a "computer" may generally be characterized as a multipurpose device that can be programmed to perform a number of different, unrelated functions. Examples of computers will thus include personal computers, such as desktop computers and laptop computers. In addition, programmable media-purposed computers (e.g., "media adapters and servers"), network-attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliances may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, however, there may be no clear defining line between whether a network device is a "computer" or a "computing appliance." For example, a sophisticated print server may be programmed to additionally or alternately function as a data storage server, while a programmable media-purposed computer or programmable personal digital assistant may have restricted functionality due to limited memory, its input devices, or its output devices. Accordingly, the term "computing device" is used herein to include both computers and computing appliances.

With conventional networks located in a home, small office, or other local environment, a network management tool that may be used in conjunction with various embodiments of the invention may be implemented on a programmable personal computer, such as a desktop or laptop computer. Similarly, a network device management tool according to various examples of the invention may be implemented on a computer. A general description of these types of computing devices will therefore now be described.

Figure 2:
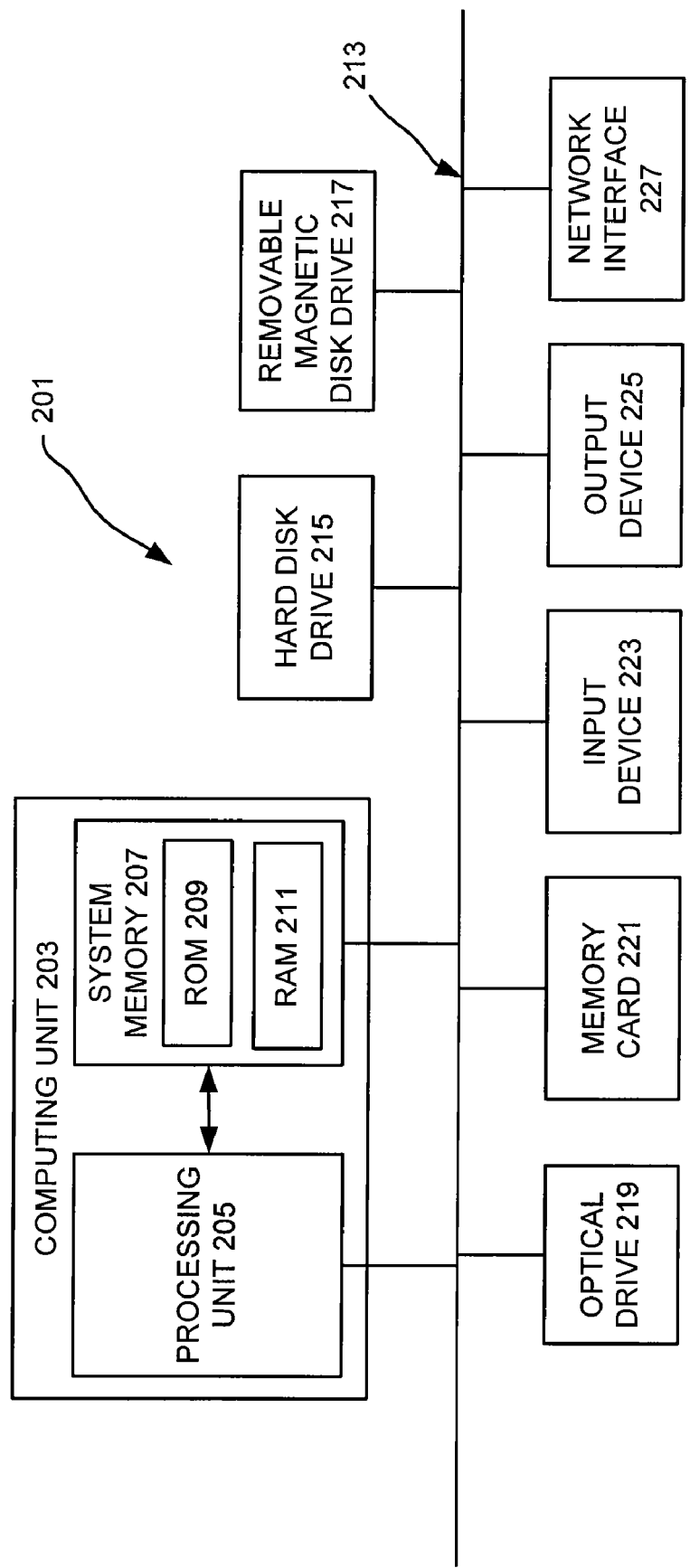
FIG. 2 is a schematic diagram of a computing device on which embodiments of the invention implemented.

An illustrative example of such a computer 201 is illustrated in FIG. 2. As seen in this figure, the computer 201 has a computing unit 203. The computing unit 203 typically includes a processing unit 105 and a system memory 207. The processing unit 105 may be any type of processing device for executing software instructions, but will conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 will be directly or indirectly connected to one or more network interfaces 227 for communicating with a network. This type of network interface 227, also sometimes referred to as a network adapter or network interface card (NIC), translates data and control signals from the computing unit 203 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 2, may include only a subset of the components illustrated in FIG. 2, or may include an alternate combination of components, including some components that are not shown in FIG. 2.

It also should be noted that, while a general description of a programmable personal computer was provided above, various embodiments of the invention may be implemented on any desired device capable of supporting the invention. For example, with some embodiments of the invention, the network management tool may be implemented on special-purposed programmable computers, such as a programmable media or entertainment-purposed computers, or personal digital assistants. Accordingly, the above description of a programmable personal computer should be understood as illustrative rather than limiting.

A computing appliance may have any combination of the components of the computer 201 discussed above. More typically, however, a computing appliance will be simpler to optimize the performance of a specific function, and thus may have only a subset of these components. For example, a computing appliance may have only a computing unit 203, an input device 223 or an output device 225, and a network interface 227. As will be apparent from the following description, however, a computing appliance will have sufficient computing resources to implement a desired embodiment of the invention in order to provide information to or receive information from a network management tool.

Network Management Tool

As previously discussed, various examples of the invention may be particularly useful to a network management tool for managing a small network. Accordingly, the operation of one such tool, the NETWORK MAGIC software application available from Pure Networks of Seattle, Washington, will be briefly described to provide the a better appreciation of the operation of various examples of the invention. This software application tool, available from Pure Networks under the name NETWORK MAGIC, is described in detail in U.S. Provisional Patent Application No. 60/634,432, filed Dec. 7, 2004, entitled "Network Management" and naming Steve Bush et al. as inventors, and U.S. patent application Ser. No. 11/297,809, filed on Dec. 7, 2005, entitled "Network Management" and naming Steve Bush et al. as inventors, which applications are incorporated entirely herein by reference.

As also previously discussed, the NETWORK MAGIC network management tool allows a user to monitor the status of devices on an electronic network, such as a network employing the Ethernet protocol located in a home or small business. The NETWORK MAGIC network management tool may also allow a user to administer various tasks associated with the network, services in the network or devices in the network.

Overview of Network Device Setup utility

Various aspects of the invention relate to a network device setup utility. As will be discussed in more detail below, a setup utility tool according to various examples of the invention may assist a user in configuring a network device, such as a network router, for use on a small network. For example, some implementations of a setup utility tool according to various examples of the invention may assist a user through the process of extracting existing configuration information from a current network connection, replacing an existing router, when applicable, correctly connecting network cables to a new router, configuring the new router with correct network connection settings, and validating that the router can successfully connect to a desired external network, such as the Internet. With various embodiments of the invention, a network device setup utility tool may be implemented to configure any router that hosts a network device management tool of the type disclosed by co-pending U.S. patent application entitled "Network Device Management," naming Brett Marl et al. as inventors, identified by and being filed concurrently with the instant application, which co-pending patent application is incorporated herein by reference. By including a network device management tool 301 in their devices, manufacturers of a network device don't need to develop a custom device configuration tool for every network device they produce. A network device setup utility can work with any router that supports a corresponding network device management tool. In addition, network device setup wizards in accordance with embodiments of the invention may work with other types of devices, including, but not limited to, a camera, a network attached storage device, and the like.

With various examples of the invention, the network device management tool may obtain data from or set data in data fields that are specific to one or more supported devices. With some implementations of the invention, the network device management tool may support one or more of the specific device types listed in the table below, in addition to a "generic" device type that may be employed for any type of network device.

TABLE 1

Figure 3:
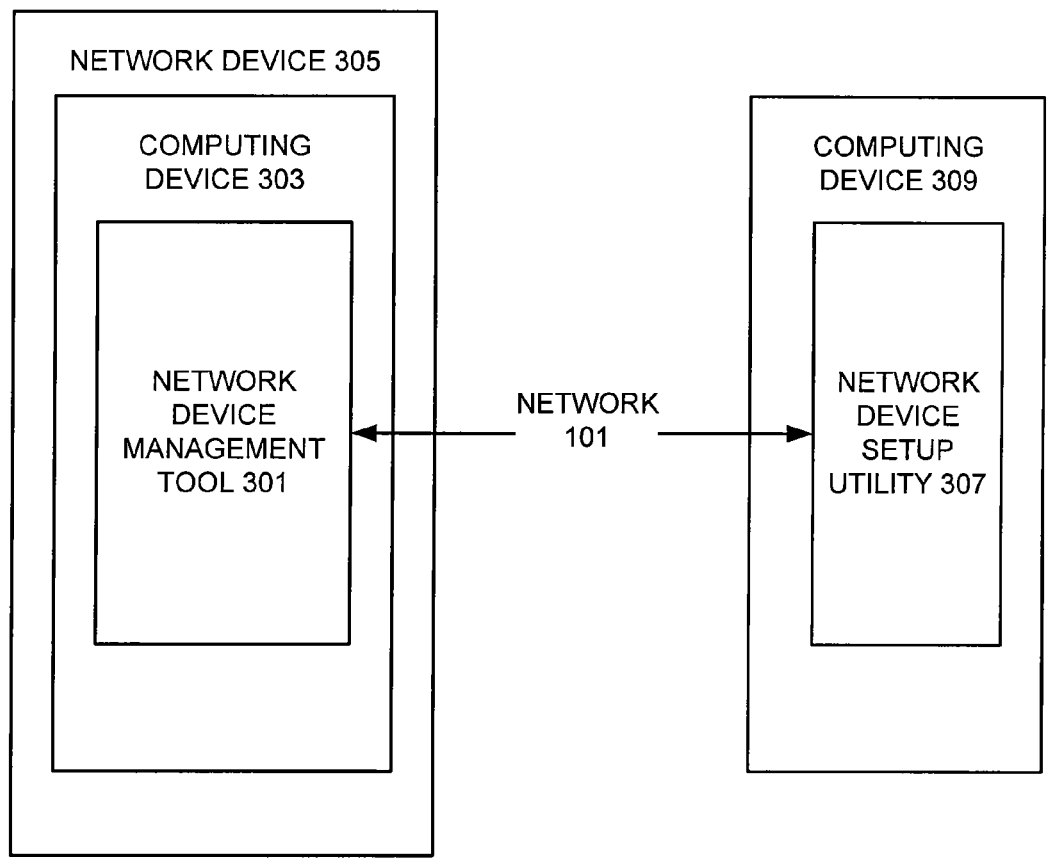
FIG. 3 shows a system that includes a network device setup utility in accordance with embodiments of the invention.

Computer
ComputerServer
WorkstationComputer
LaptopComputer
Gateway
GatewayWithWiFi
DigitalDVR
DigitalJukebox
MediaAdapter
NetworkCamera
NetworkDevice
NetworkDrive
NetworkGameConsole
NetworkPDA
NetworkPrinter
NetworkPrintServer
PhotoFrame
VOIPDevice
WiFiAccessPoint Network Device Setup utility FIG. 3 includes a network device management tool 301 within computing device 303 that communicates with the network device setup utility 307 via the network 101. In accordance with other embodiments of the invention the network device management tool 301 may be otherwise associated with the network device 305.

A network device management tool 301 in accordance with embodiments of the invention may be associated with various types of network devices, including, but not limited to, the types of network devices listed in Table 1 above.

Network Device Setup

Introduction

In accordance with various embodiments of the invention, a network device setup utility 307 (FIG. 3) presents user-interface display screens that are context-specific with respect to the user's progress in the process of setting up a network device, such as a router. With some embodiments of the invention, the use of a network device setup utility may begin the moment a user opens the box, in which the network device is packaged, and continue until the user has successfully brought up a network management tool, such as the NETWORK MAGIC network management tool, which, among other functionality, displays a network map of a functioning home network comprised of at least one computing device, the router, and the modem.

Overview of Network Device Setup

In accordance with various embodiments of the invention, the packaging of a network device 305 to be configured, such as a router, directs the user to insert an installation disc into computing device 309 before the user makes any changes to current network settings and before the user even plugs the router in. There may be a sticker over the ports of the router directing the user to insert the installation disc into the computing device 309 before plugging cables into any of the router ports.

When the network device setup configuration 307 starts executing on the computing device 309, the network device setup configuration 307 may examine the current network configuration and make sure that the network is functional before starting the router installation process.

The network device setup configuration 307 will then gather information about the existing connection. This can include how the system is configured for Internet Protocol ("IP") access, including such data as DHCP information, DNS servers, IP addresses and any authentication context—such as PPOE required to use the connection. This information may come from an existing router or modem device, or the local host computer itself. The IP configuration information will vary depending on the connection type.

The network device setup utility 307 will then present to the user step-by-step instructions showing the user how to connect pertinent network devices to the network 101.

The network device setup utility 307 will then reconfigure the network 101 and send to the network device 305 (e.g., a router) the previously gathered IP configuration information.

At this point, the network device (e.g., a router) will be functional and a network management tool, such as NETWORK MAGIC, may be offered to the user.

Figure 4:
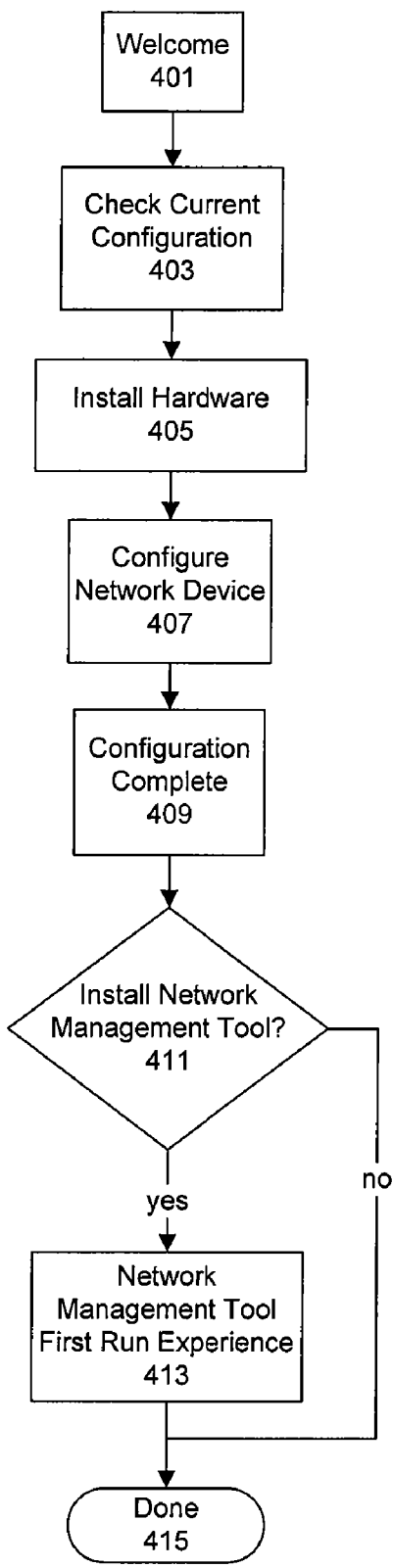
FIG. 4 is a flow diagram that shows the basic flow of a network device setup utility in accordance with embodiments of the invention.

FIG. 4 is a flow diagram that shows the basic flow of the network device setup utility 307 in accordance with embodiments of the invention. FIG. 4 is discussed in the context of configuring a router and then optionally running the NETWORK MAGIC network management tool. Embodiments of the invention may also be used for configuring other types of network devices and/or optionally running different network management tools.

As shown in FIG. 4, a network device setup utility 307 in accordance with embodiments of the invention performs a welcome step as shown at 401, checks the current configuration as shown at 403, installs hardware as shown at 405, configures a network device at step 407, completes configuration at step 409, determines whether to install a network management tool at 411, launches the network management tool, if appropriate, as shown at 413, and finishes processing at 415.

Figure 5:
FIG. 5 shows an example splash screen displayed in accordance embodiments of the invention.
Figure 6:
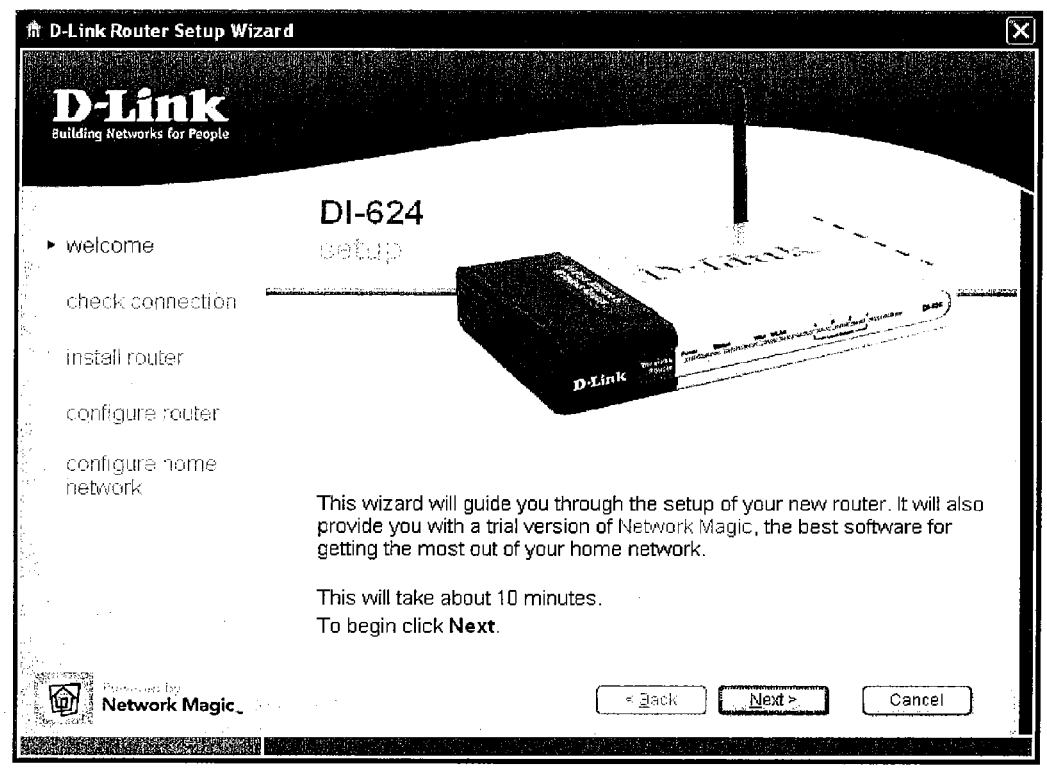
FIG. 6 shows an example welcome screen displayed in accordance embodiments of the invention.

The welcome step 401 may include launching a splash screen, such as the splash screen shown in FIG. 5, performing preliminary processing, and then displaying a welcome screen, such as the welcome screen shown in FIG. 6.

Figure 7:
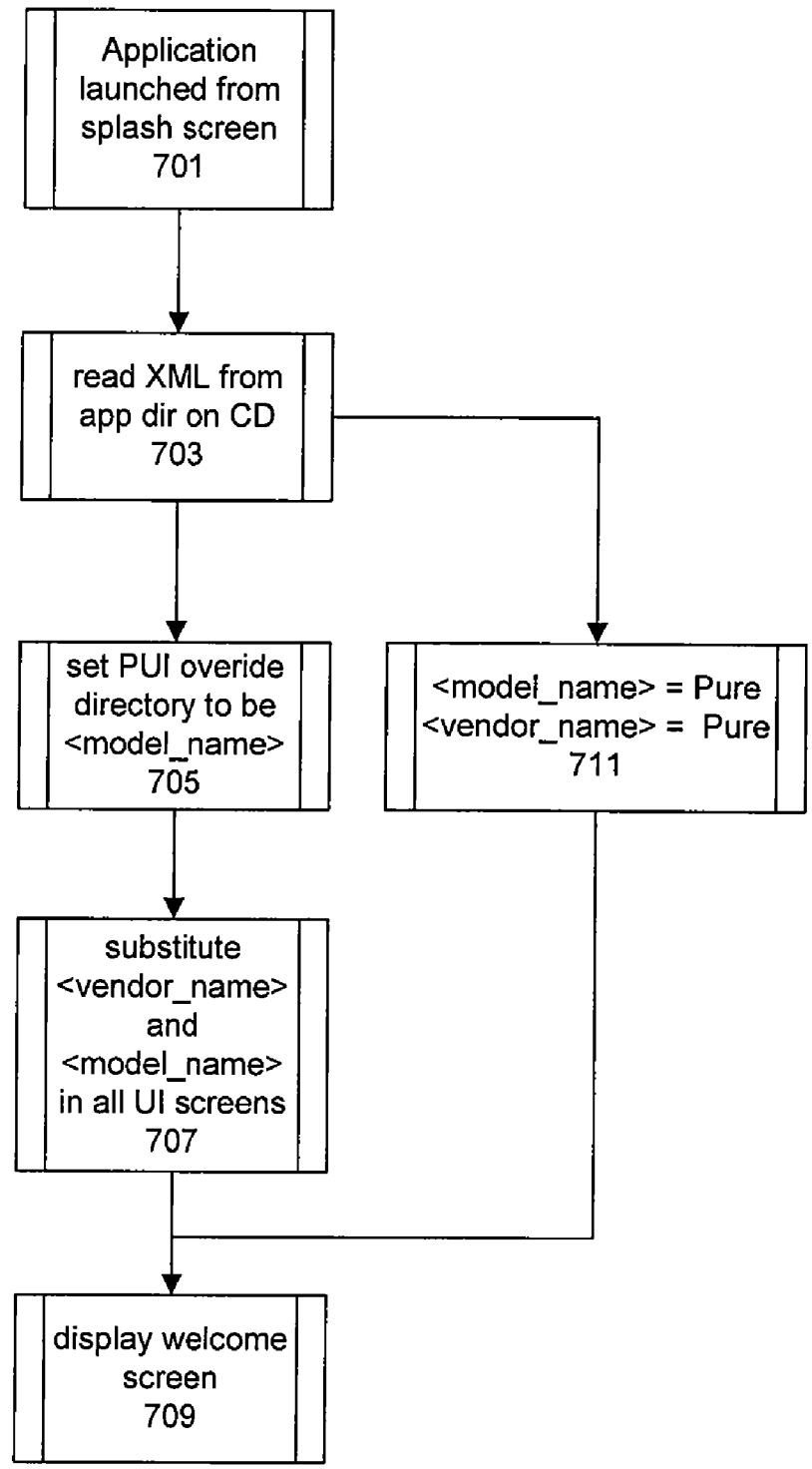
FIG. 7 is a flow diagram showing more detailed steps of the welcome step of FIG. 4.

FIG. 7 is a flow diagram showing more detailed steps of the welcome step 401 of FIG. 4. As indicated at 701, processing begins, such as in response to a user activating the "install router" user-interface control of the splash screen shown in FIG. 5.

Running the network device setup utility 307 for different types of network devices (e.g., different router models) will use different resources depending on the type of network device being setup by the utility. Resources that differ to customize the network device setup utility's user interface ("UI") in a network-device-specific way may be stored in a subdirectory of the network device setup utility's application directory. These directories may be named by device type (e.g., by router Model Number).

In accordance with embodiments of the invention, the network device setup utility's application directory on the installation disc contains an XML descriptor file that is stored in the network device that is packaged together with the installation disc.

When the network device setup utility 307 starts up, the network device setup utility 307 will read that XML descriptor file and set the UI to read graphics specific to that model number from the relevant subdirectory by matching the <model_name> string from the XML file stored at the root with the same tag in the XML files in the subdirectories. An example of this XML file name might be TEADcvInfo.xml or gateway.xml.

Referring to FIG. 7, at 703, the XML file is read from the application directory on the installation disc. The PUI override directory is then set to be <model_name>, as shown at 705. <Vendor_name> and <model_name> may be substituted into user-interface screens, as shown at 707. As shown at 711, <model-name> and <vendor_name> are set (e.g., to "Pure"). A welcome screen, such as the welcome screen shown in FIG. 6 is then displayed, as shown at 709.

Figure 8:
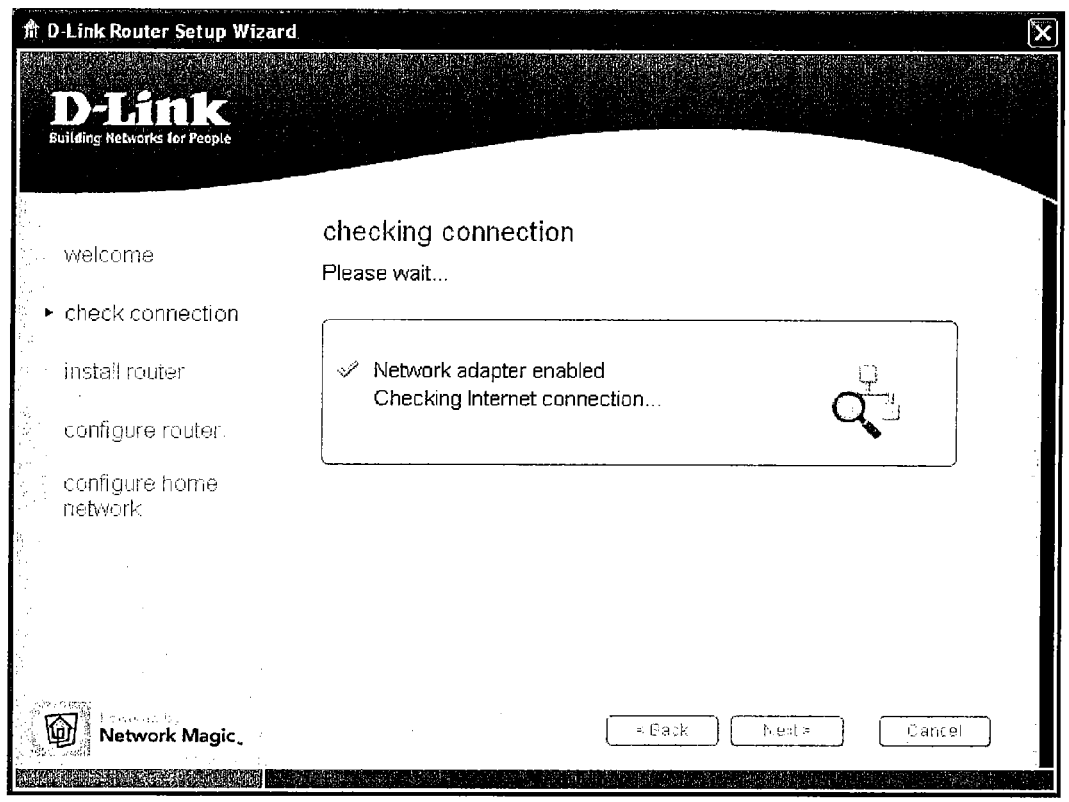
FIG. 8 shows an example check-connection screen displayed in accordance embodiments of the invention.

When the user presses the Next button on the Welcome screen of FIG. 5, the Check Connection screen of FIG. 8 is displayed and processing will proceed to the check current configuration step 403.

Figure 9A:
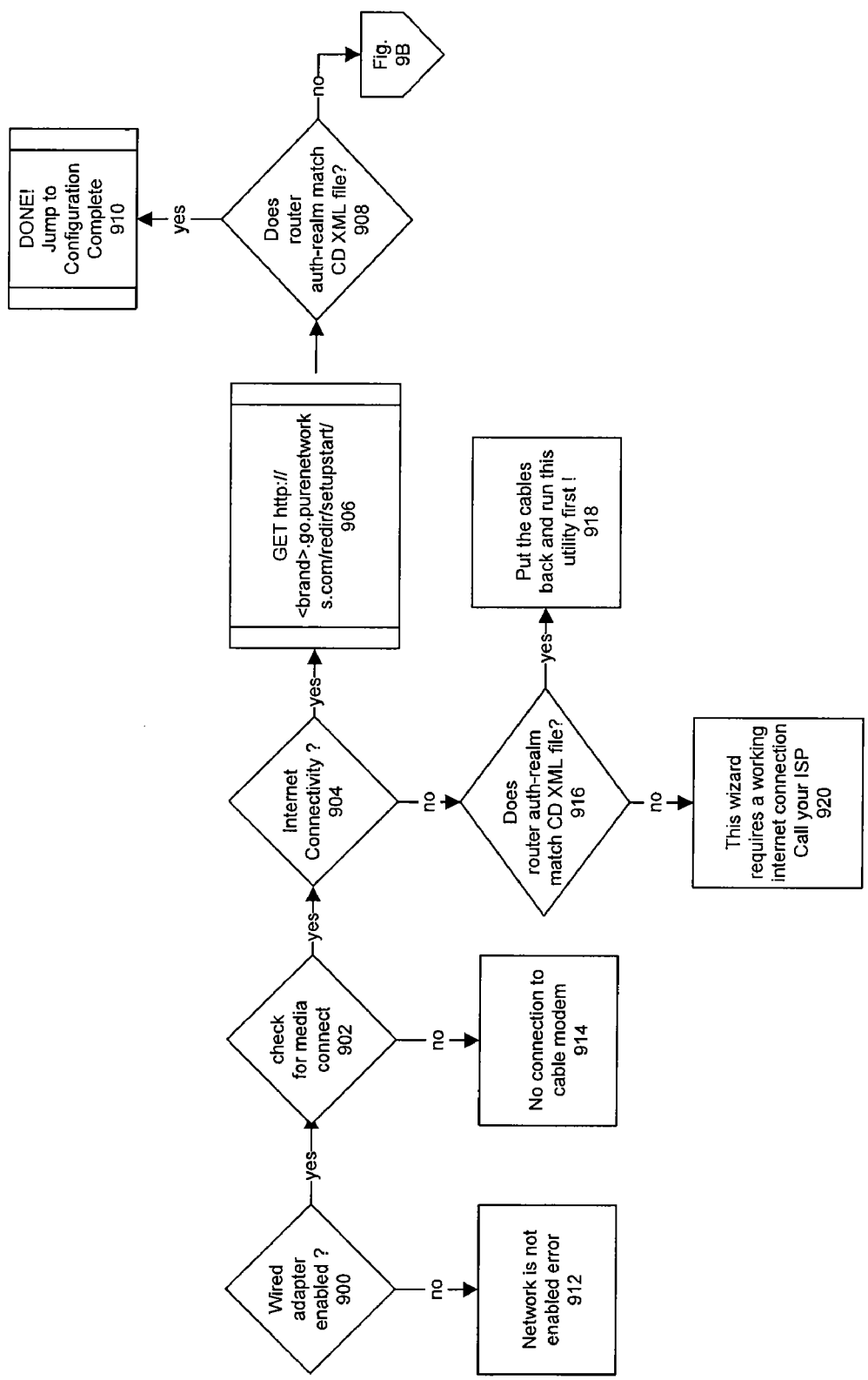
FIGS. 9A and 9B show more detailed steps of the check current configuration step of FIG. 4 in accordance with embodiments of the invention.
Figure 9B:
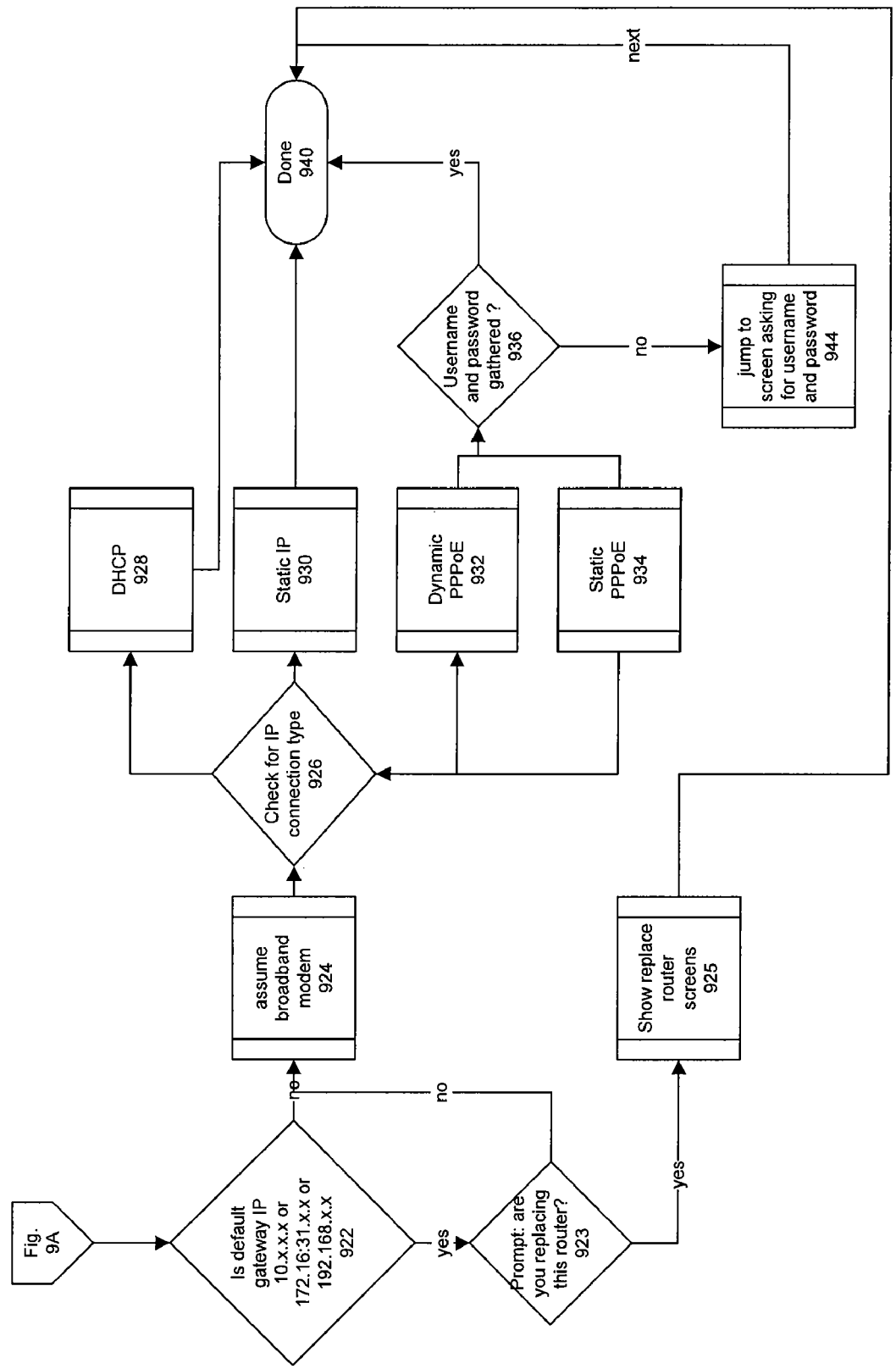

FIGS. 9A and 9B show more detailed steps of the check current configuration step 403 in accordance with embodiments of the invention. At 900, a determination is made with respect to whether a wired adapter is enabled. This determination can be made using well-known operating system application programming interfaces (APIs). If not, a network not enabled error 912 occurs and a corresponding error message may be displayed to the user.

At 902, a determination is made with respect to whether a media connection exists. Again, this determination can be made using well-known operating system application programming interfaces (APIs). If not, a no connection to cable modem error 914 occurs and a corresponding error message may be displayed to the user.

At 904, a determination is made with respect to whether Internet connectivity exists. This connectivity test is executed by issuing an HTTP GET method to a well known URI, if the expected resource is returned, it is assumed that connectivity is established. If the destination is unreachable, or another type of HTTP transport error is returned, then the connectivity state is considered disconnected.

If there is no connectivity, one plausible reason could be that the user has not followed the instructions to insert the CD before unpacking the router. To determine if the user has attempted to manually configure the router themselves, a quick check is made to see if the current connected router is the same model and version number as the one that corresponds to the CD in the box. This check is performed in step 916, where a determination is made with respect to whether the local router is the router being configured. This check is performed by issuing an HTTP GET against the root document on the IP address of the local router. Most routers require BASIC authentication and will identify their model number as part of the authentication realm returned during a BASIC authentication handshake. This auth-realm value containing the model number is compared with the model number located in the XML descriptor file on the CD. If they match, then the router is considered to be the new router, and step 918 will show an error screen informing the user to return the router to the box and configure their network in its pre-purchase configuration. If the auth-realm does not match, then an Internet connection not working error 920 occurs as it is assumed that the configuration is not valid.

If a determination is made at 904 that Internet connectivity exists, then an HTTP GET 906 is performed against a well known metrics URI to record the fact that the setup wizard is about to begin. More particularly, with various examples of the invention, any known or configured metrics URI can be employed to measure starts, successful completes and errors. In this manner, the number of setup attempts that succeed and/or are abandoned or are failing can be determined. These metrics can be reviewed later to ensure that the network device setup utility 307 is performing correctly in the field.

At 908, the router that is providing a valid connection to the Internet is checked to determine if it is the same as the device in the box. This check is performed by issuing an HTTP GET against the root document on the IP address of the local router. Most routers require BASIC authentication and will identify their model number as part of the authentication realm returned during a BASIC auth handshake. This auth-realm value containing the model number is compared with the model number located in the XML descriptor file on the CD. If they match, then the router is considered to be the new router and it is assumed to have been configured correctly. Flow proceeds to step 910 to a congratulations screen telling the user that the router has been correctly configured. If the authentication realm check doesn't pass then processing proceeds as shown in FIG. 9B.

Figure 26:
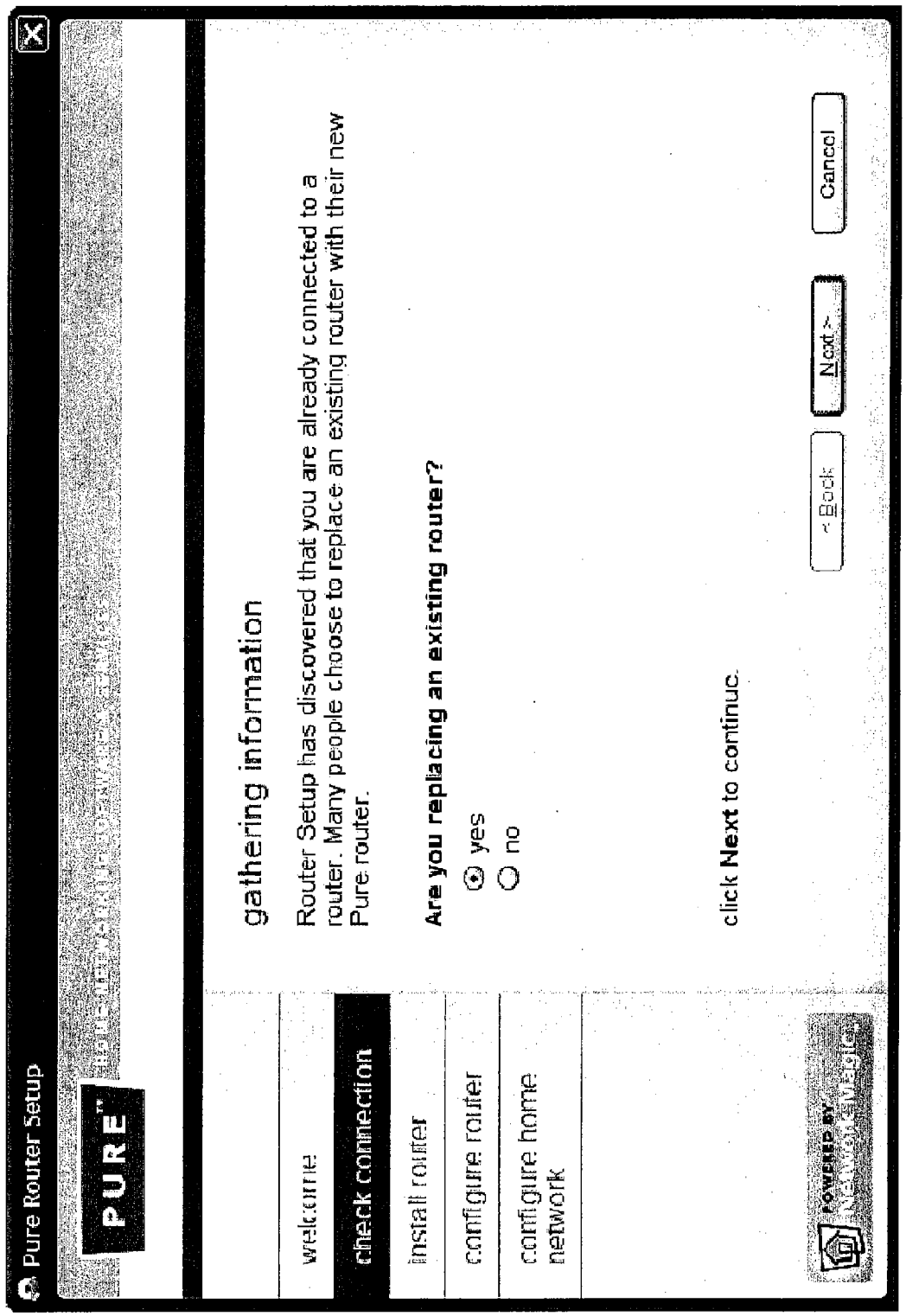
FIG. 26 shows an example existing-router-replacement-inquiry screen displayed in accordance embodiments of the invention.
Figure 27:
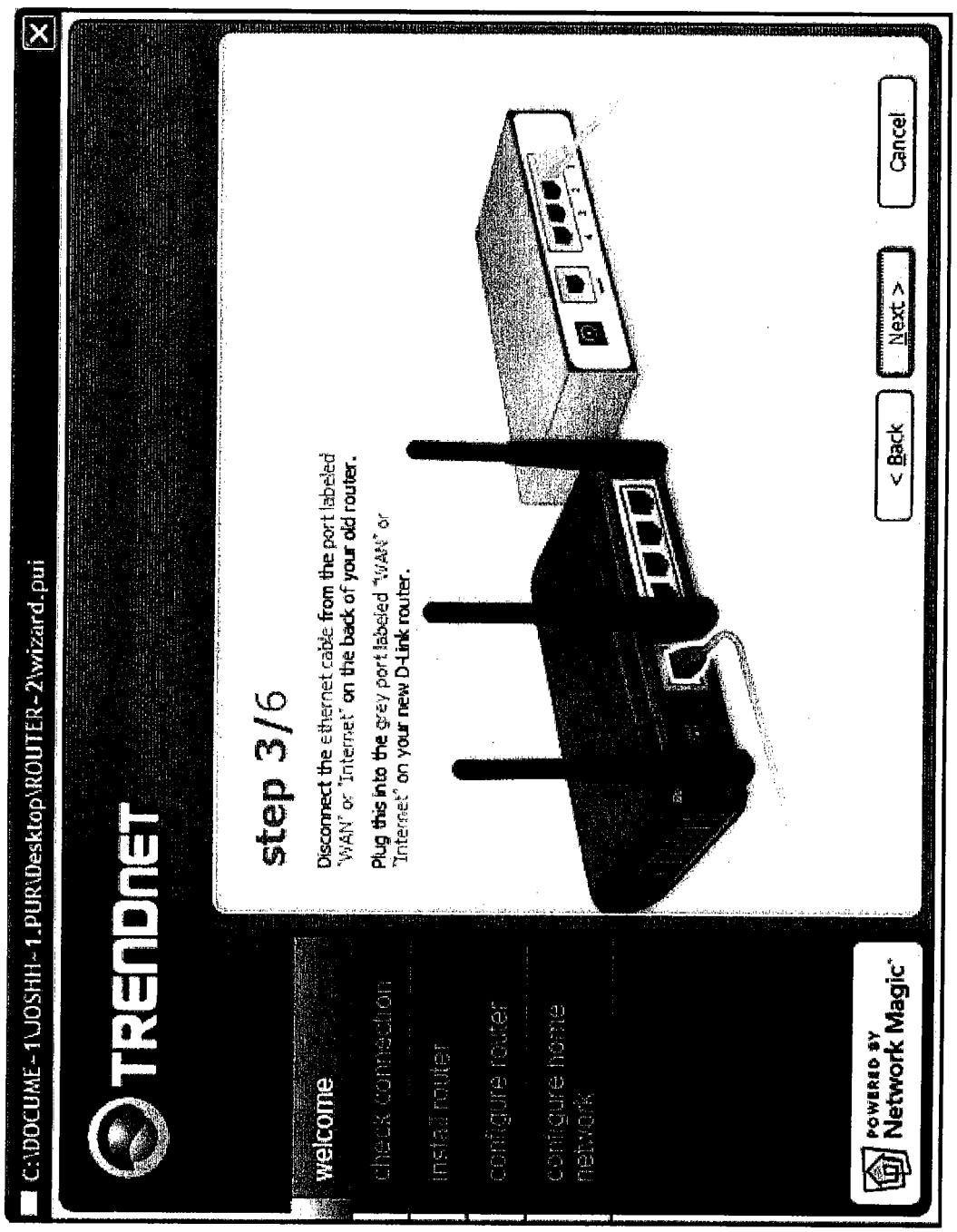
FIGS. 27-28 show example configuration-instruction screens displayed in accordance embodiments of the invention.
Figure 28:
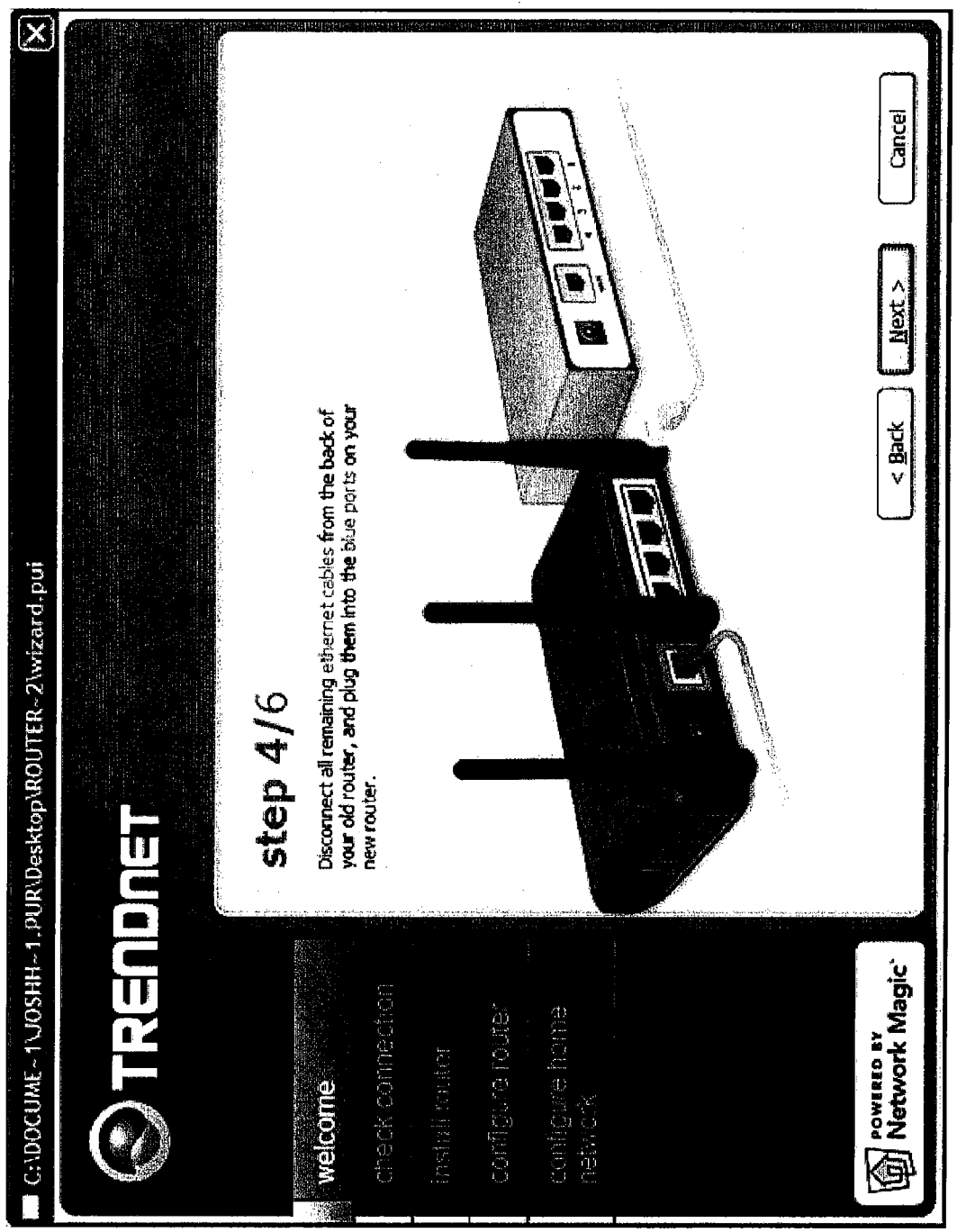

A determination is made with respect to whether the default gateway IP address is an internal address (e.g., 10.x.x.x or 172.16:31.x.x or 192.168.x.x), as shown at 922. If so, then an existing router is already in place. The network device setup utility 307 prompts the user to ask if they are intending to replace this router with the new one in step 923. An example of this prompt is shown in FIG. 26. If the user selects yes to this prompt, the user is shown a different set of configuration instruction screens 925 as shown in FIGS. 27 and 28. Otherwise, an assumption is made that the default gateway is a broadband modem, as shown at 924.

Figure 10:
FIG. 10 shows an example internet-service-provider screen displayed in accordance embodiments of the invention.

A determination is then made with respect to the broadband modem's IP connection type, as shown at 926. If the IP connection type is determined to be DHCP or static IP, then a check of the current configuration processing is done, as shown at 928, 930, and 940. Again, this determination can be made using well-known operating system application programming interfaces (APIs). If the IP connection type is determined to be dynamic PPPoE or static PPPoE, a determination is made with respect to whether enough detailed information has been gathered regarding the Internet connection, such as whether the connection's username and password have been gathered, as shown at 936. If not, a user may be prompted to enter a username and password, such as by the display screen shown in FIG. 10.

Figure 11:
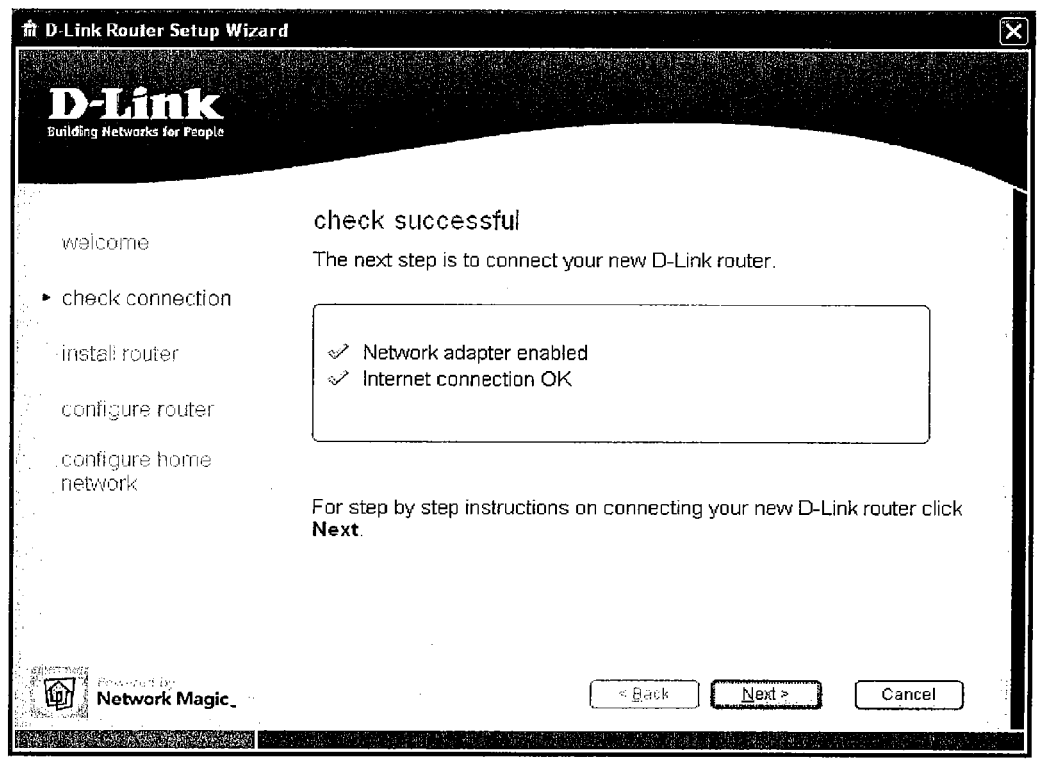
FIG. 11 shows an example configuration-check-successful screen displayed in accordance embodiments of the invention.

A user interface screen, such as the one shown in FIG. 11, may be displayed to indicate that the configuration check has completed successfully and that installing hardware is the next step.

Referring to FIG. 4, following completion of the check current configuration step 403, the install hardware step 405 is performed. FIGS. 12-16 show example user interface displays, in accordance with embodiments of the invention, that may be used for providing graphical instructions for connecting the network device being setup to the network.

Figure 12:
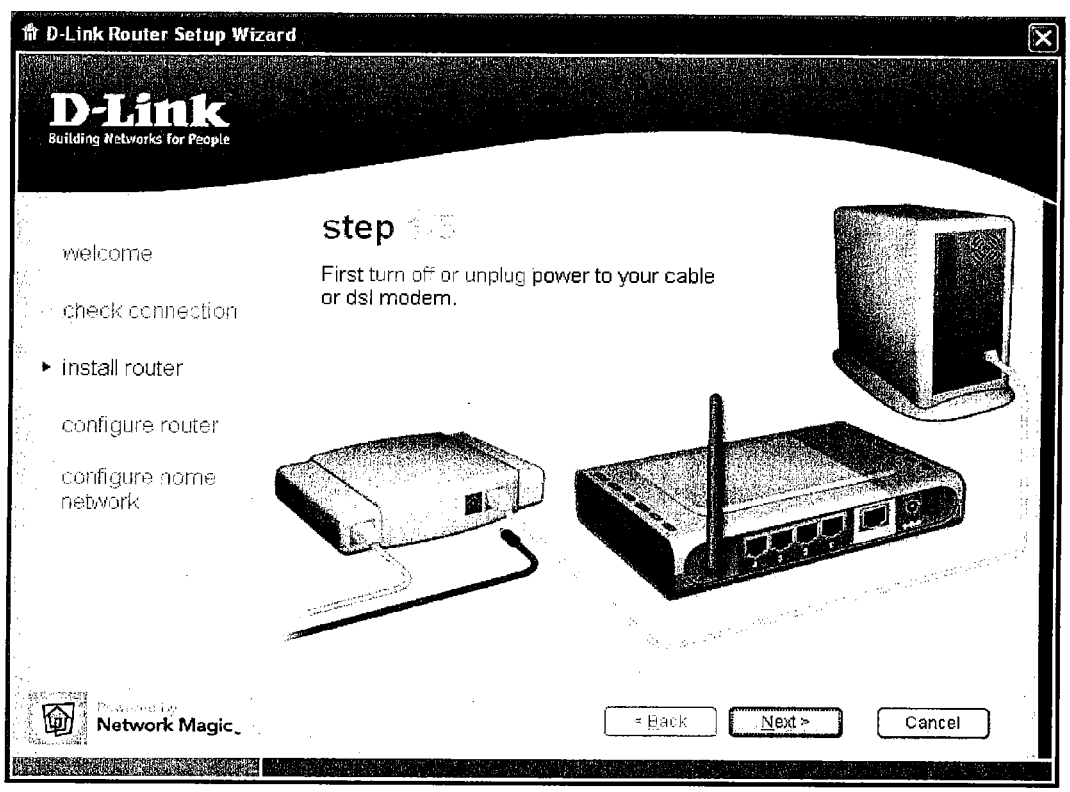
FIGS. 12-16 show example user interface displays, in accordance with embodiments of the invention, which may be used for providing graphical instructions for connecting the network device being setup to the network.

FIG. 12 shows a user interface display screen with instructions to turn off or unplug the power to the broadband modem.

Figure 13:
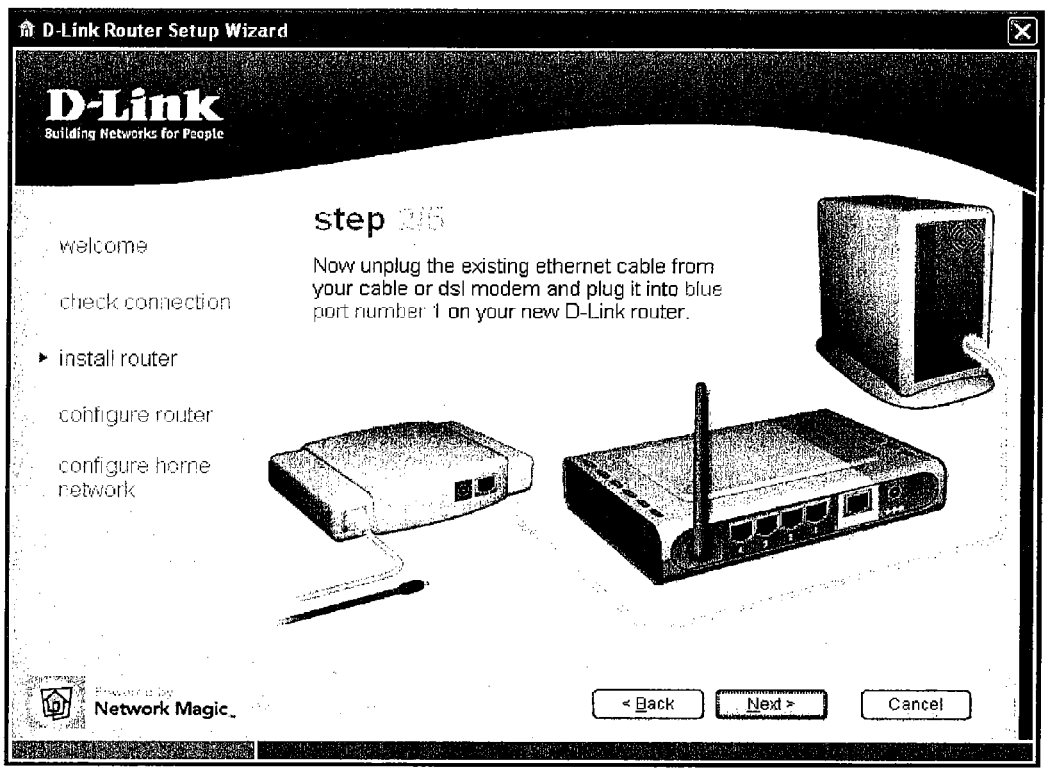

FIG. 13, shows a user interface display screen with instructions connecting the computing device 309 to the network device, which in this example is a router.

Figure 14:
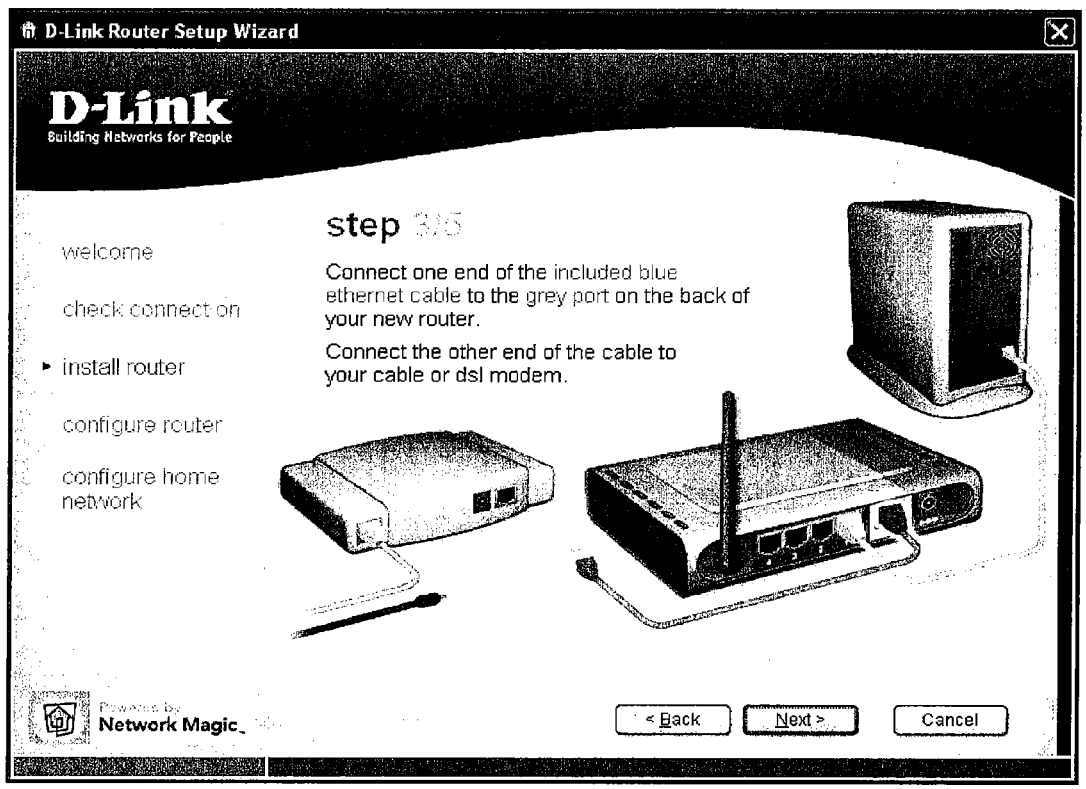

FIG. 14 shows a user interface display screen with instructions for connecting the router to a modem.

Figure 15:
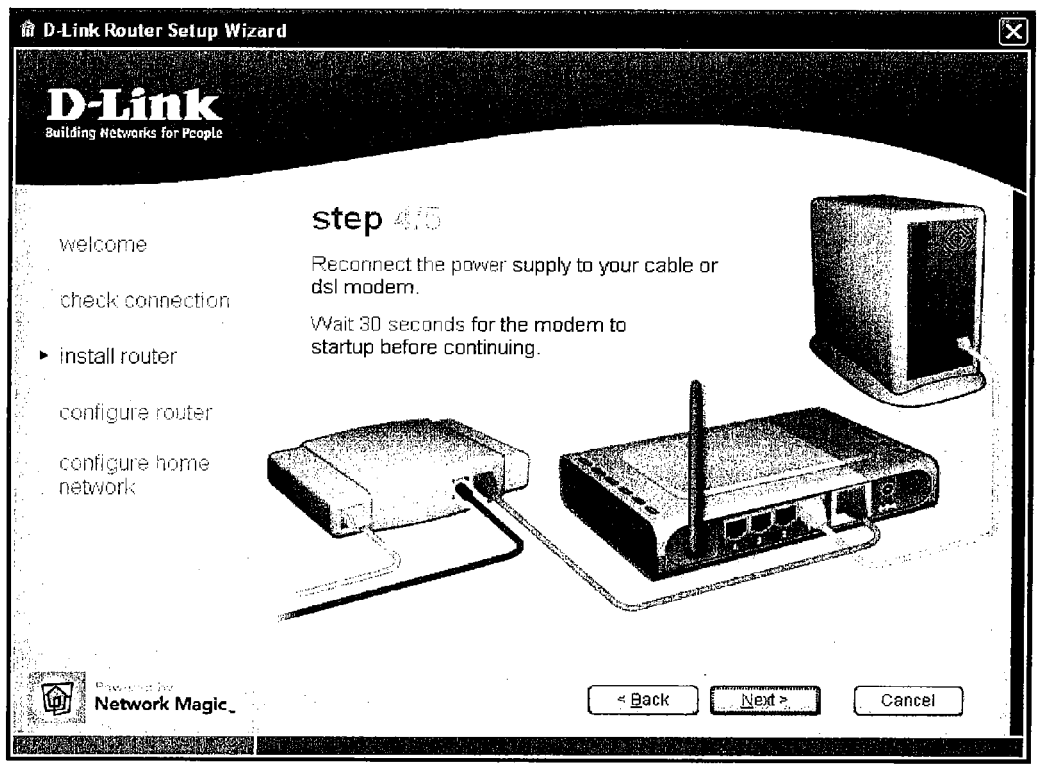

FIG. 15 shows a user interface display screen with instructions for connecting power to the modem.

Figure 16:
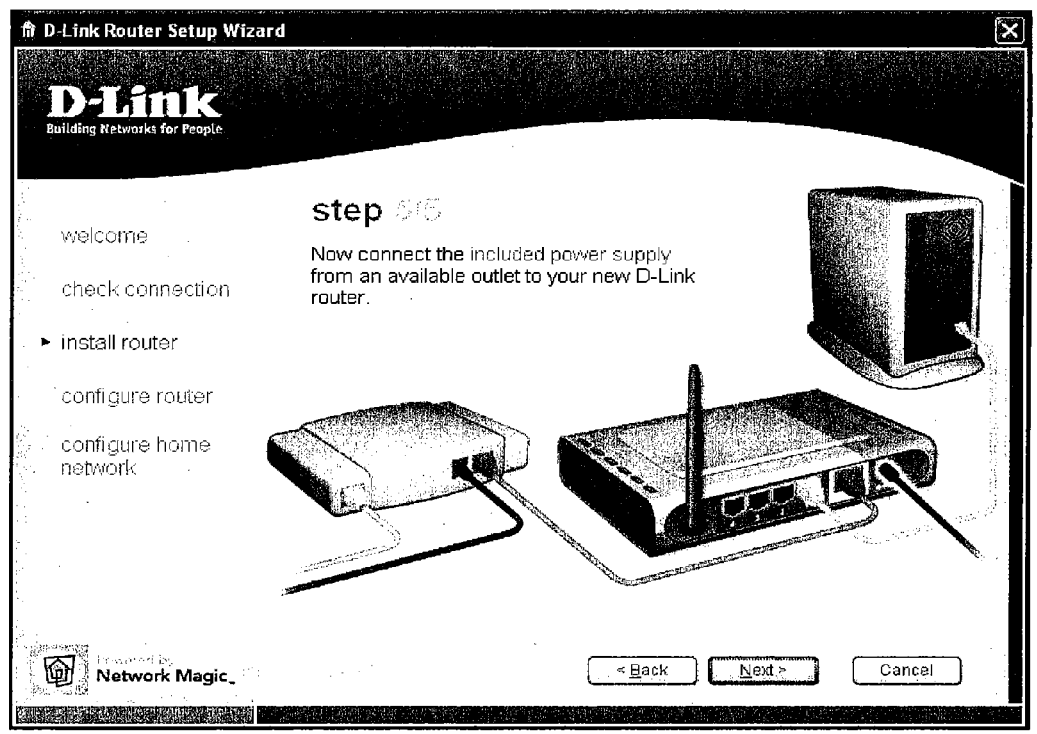
Figure 17:
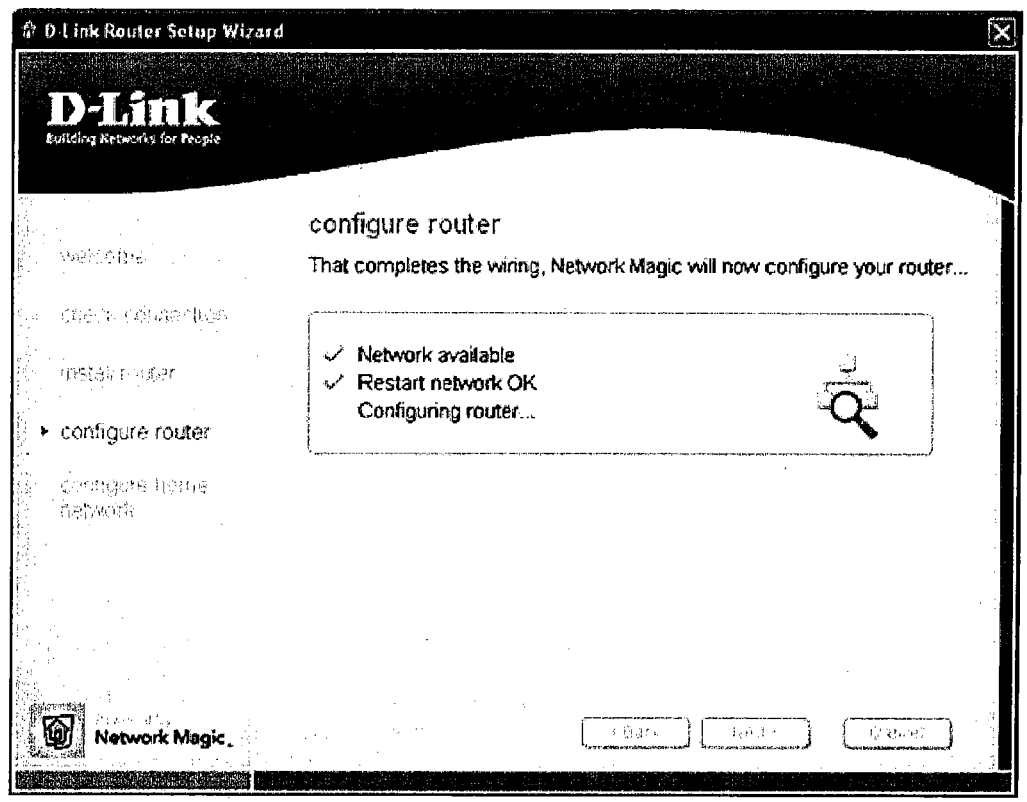
FIG. 17 shows an example configure-router screen displayed in accordance embodiments of the invention.

FIG. 16 a user interface display screen with instructions for connecting power to the router. When the Next button shown in FIG. 16 is pressed, processing moves from the install hardware step 405 to the configure network device step 407, and the example configure-router display shown in FIG. 17 may be displayed.

As part of the configure network device step 407, the network device setup utility 307 may change the settings on the network adapter to DHCP and restart the network adapter. It may also release any existing DHCP leased address and request a new IP address from the DHCP server.

The network device setup utility 307 may try to ping the router. If the device setup utility 307 cannot ping the router, a corresponding error message may be displayed. Further, if the router is making DHCP REQUEST calls, that suggests that the cables have been plugged in backwards. Under such circumstances, the user may be instructed to return to the cabling step.

The WAN setting may then be configured on the router. This involves sending the connection information gathered during the check current configuration step 403. The network device setup utility 307 may communicate settings, such as the following types of settings, to a router via the network device management tool 301 using a suitable protocol, which is discussed in more detail in the co-pending application which is incorporated herein by reference.

Figure 18A:
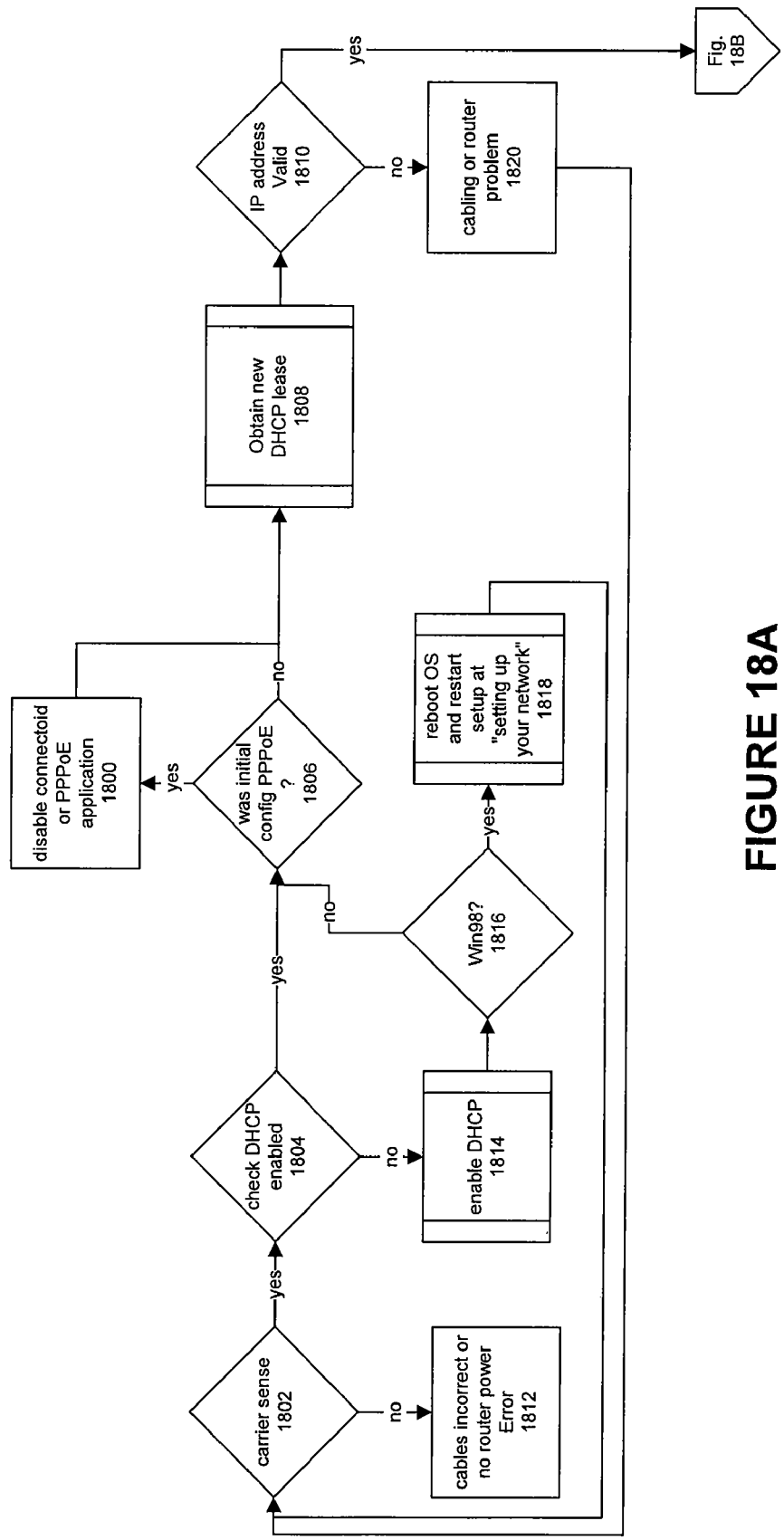
FIGS. 18A and 18B show steps for configuring a network device in accordance with embodiments of the invention.
Figure 18B:
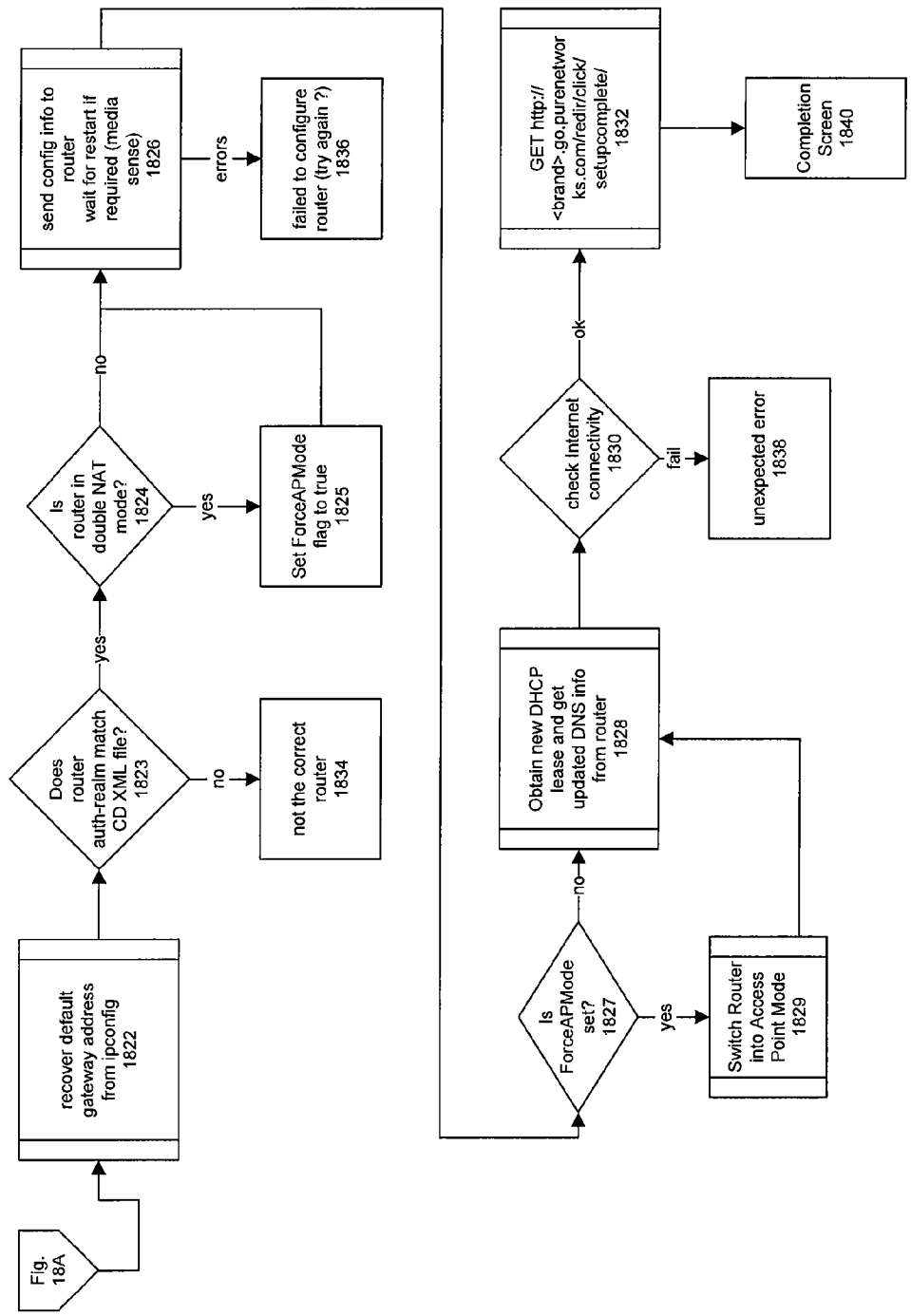

FIGS. 18A and 18B show steps for configuring the network device 305 in accordance with various embodiments of the invention. As shown in FIG. 18A, a determination is made with respect to whether a line voltage or "carrier" is sensed at 1802. If not, a "cable incorrect" or "no router power error" 1812 occurs. If a carrier is sensed, a determination is made with respect to whether DHCP is enabled on the local adapter at 1804. If not, DHCP is enabled on the local adapter at 1814 and, if the computing device's operating system is Windows 98, the operating system is restarted and the configure network device 407 is restarted. If DHCP is already enabled on the local adapter, then the yes branch from 1804 is taken, and a determination is made with respect to whether the initial configuration was using PPPoE. If so any PPPoE-connectoid or $3^{rd}$ party PPPoE application is disabled at 1800 before moving to step 1808. At step 1808 a new DHCP lease is obtained. A determination is made at 1810 with respect to whether the IP address is valid. If not, there is a cable or router problem as shown at 1820. If so, then processing continues at step 1822 in FIG. 18B.

The default gateway address is obtained from TCP/IP settings at 1822. This gateway address is used to examine the router to determine if it is the new device shipping in the box. At 1823, a check is performed by issuing an HTTP GET against the root document on the IP address of the gateway as determined in 1822. Most routers require BASIC authentication and will identify their model number as part of the authentication realm returned during a BASIC authentication handshake. This auth-realm value containing the model number is compared with the model number located in the XML descriptor file on the CD. If they do no match then an incorrect router error occurs at 1834. If they do match, then processing continues to 1824. In step 1824, the router is examined to determine if it is in a double-NAT configuration. To determine this, the router LAN IP address is compared with the router WAN ip address. If the IP addresses are both non-routable addresses and they are both on the same subnet the router is considered to be in a double-NAT configuration. If this is true then a ForceAPMode flag is set in 1825 to be used later in the logic. Processing continues at 1826 where configuration information is sent to the router and a restart is waited for as appropriate, as shown at 1826. If there are errors, then a router configuration error occurs at 1836. If there are no errors, then the ForceAPMode flag is checked. If this was set to true AND the router supports configuration in access point mode, then an HNAP request is sent to the router in 1829 to configure it into access point mode. In gateway mode, the router will respond as a DHCP server using NAT to assign IP Addresses to devices connecting on the LAN or WLAN segments. In access point mode, the router will act as a simple bridge moving data between the WAN and LAN ports. If another router is managing the connection to the internet, this will allow packets to flow correctly.

Figure 19:
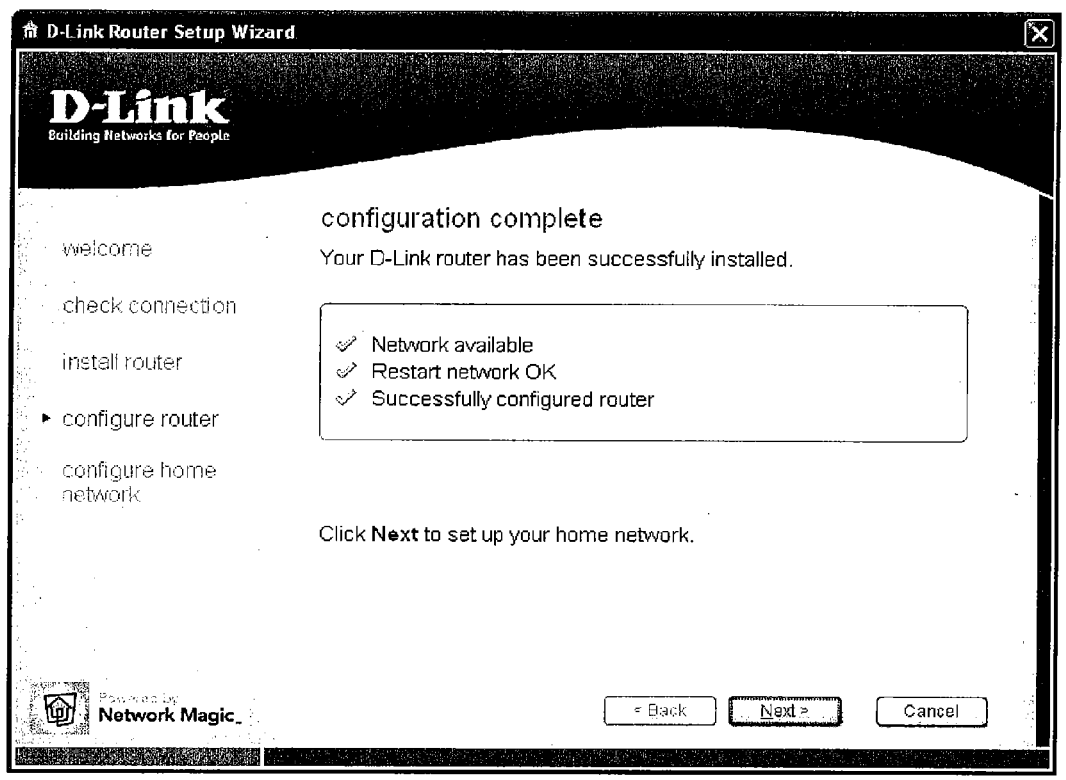
FIG. 19 shows an example configuration-complete screen displayed in accordance embodiments of the invention.

Once the router is configured in access point mode, or if the ForceAPMode flag was not set in step 1827, then processing continues to 1828. In step 1828 a new DHCP lease is requested from the DHCP server in the router to get updated DNS information at 1828. Internet connectivity is then checked at 1830. If there is a problem with the Internet connectivity, then a corresponding error occurs, as shown at 1838. Otherwise, a request is made in 1832 to a well known URI to record metrics about the successful completion of the wizard. A configuration complete screen, such as the one shown in FIG. 19, is then displayed as shown at 1840.

Once the internet connection has been verified, the network device setup utility may set up the wireless interface of the router as appropriate, such as, for example, when a GetDeviceSettings( ) call to the network management device disclosed in returns a list of methods which contains SetWLanSettings24( ).

Figure 20:
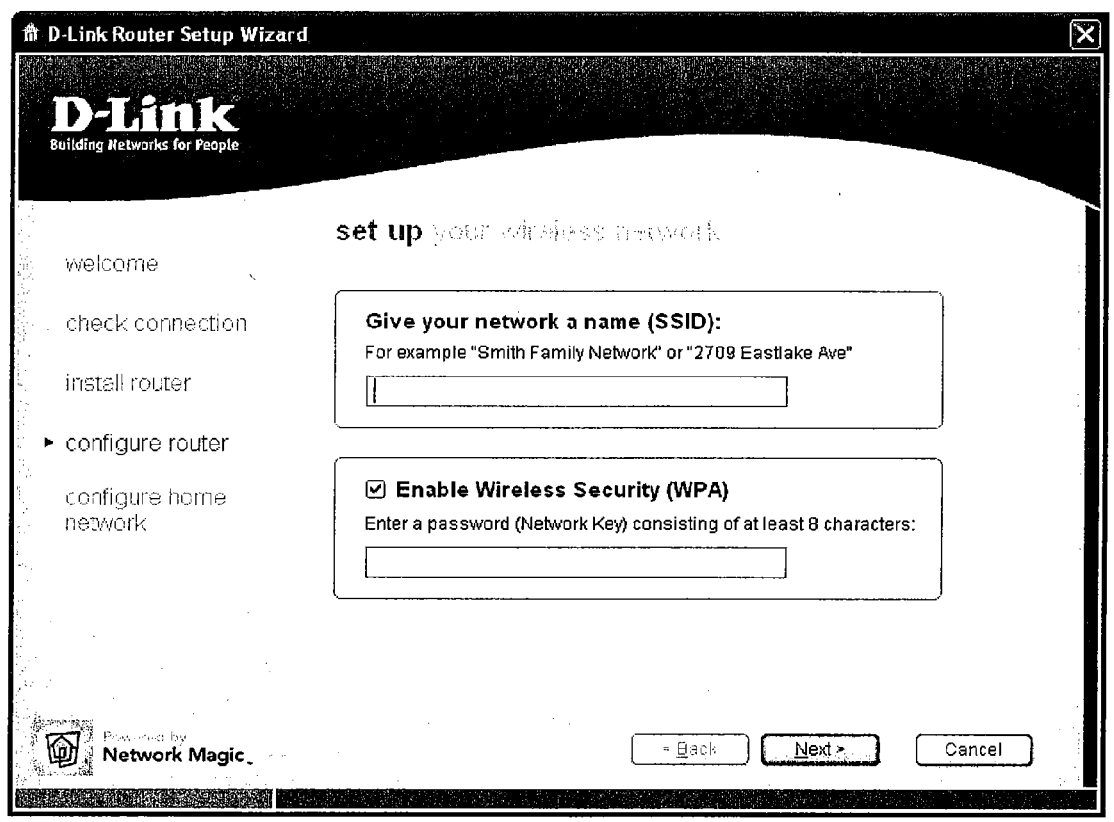
FIG. 20 shows an example wireless-network-set-up screen displayed in accordance embodiments of the invention.
Figure 21:
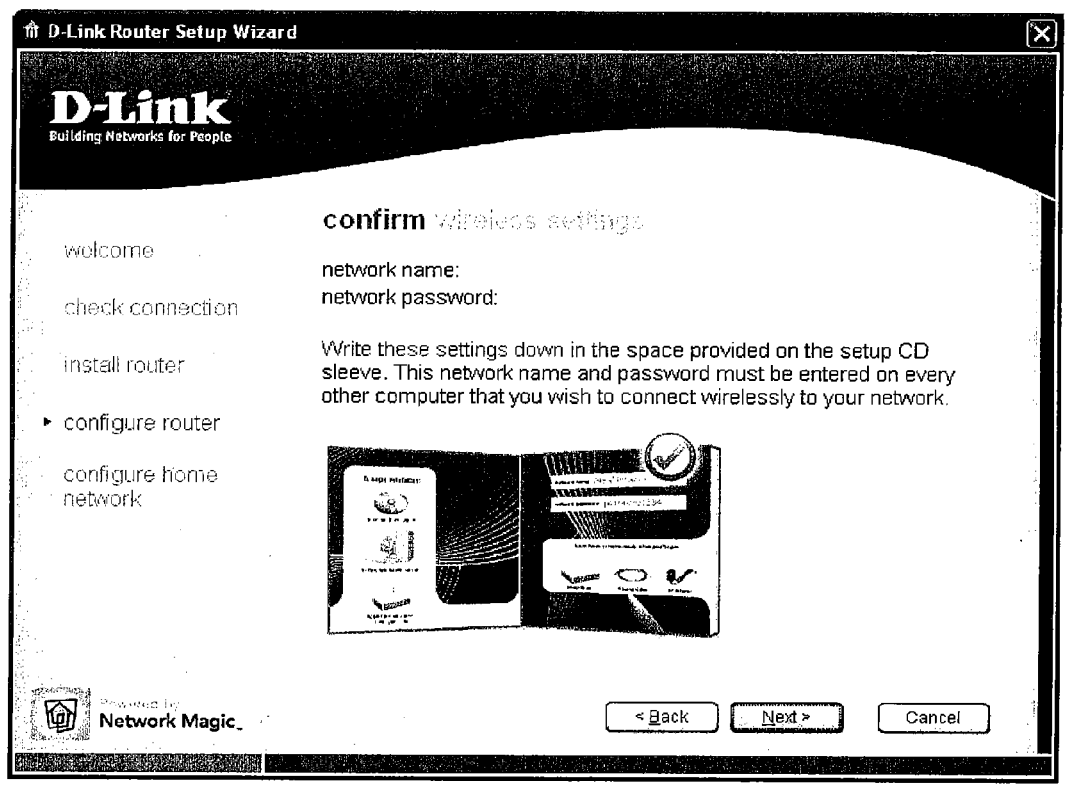
FIG. 21 shows an example confirm-wireless-settings screen displayed in accordance embodiments of the invention.

FIG. 20 shows a display screen for setting up a wireless network that prompts a user to input a wireless network name and password. Upon validation of the input to these fields, a user interface screen, such as the one shown in FIG. 21, may be displayed for confirming the wireless network name and password and the SSID and password may be sent to the router.

Configuration Complete

Figure 22:
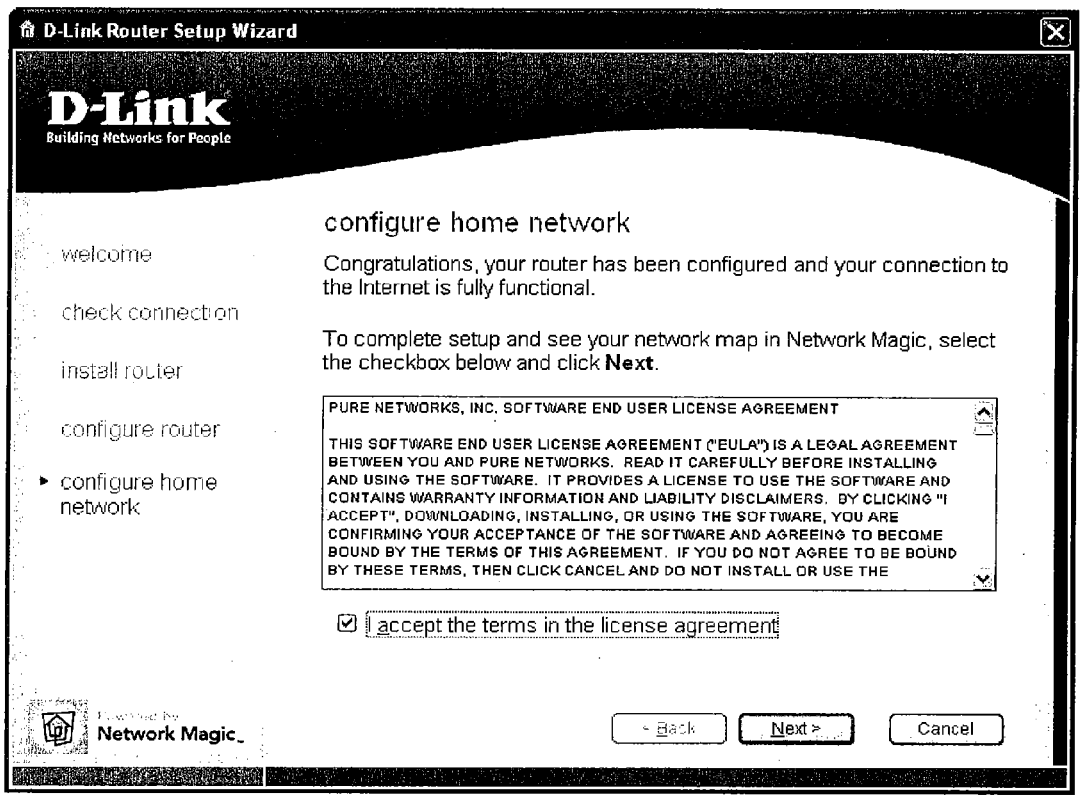
FIG. 22 shows an example configure-home-network screen displayed in accordance embodiments of the invention.

Referring to FIG. 4, following completion of the configure network device step 407, the configuration complete step 409 is performed. Once the network device (e.g., a router) has been successfully configured, the user will be notified accordingly via a user interface screen such as the one shown in FIG. 22. The display screen of FIG. 22 also offers to install a network management tool (e.g., NETWORK MAGIC) for configuring a small network, such as a home network.

Figure 23:
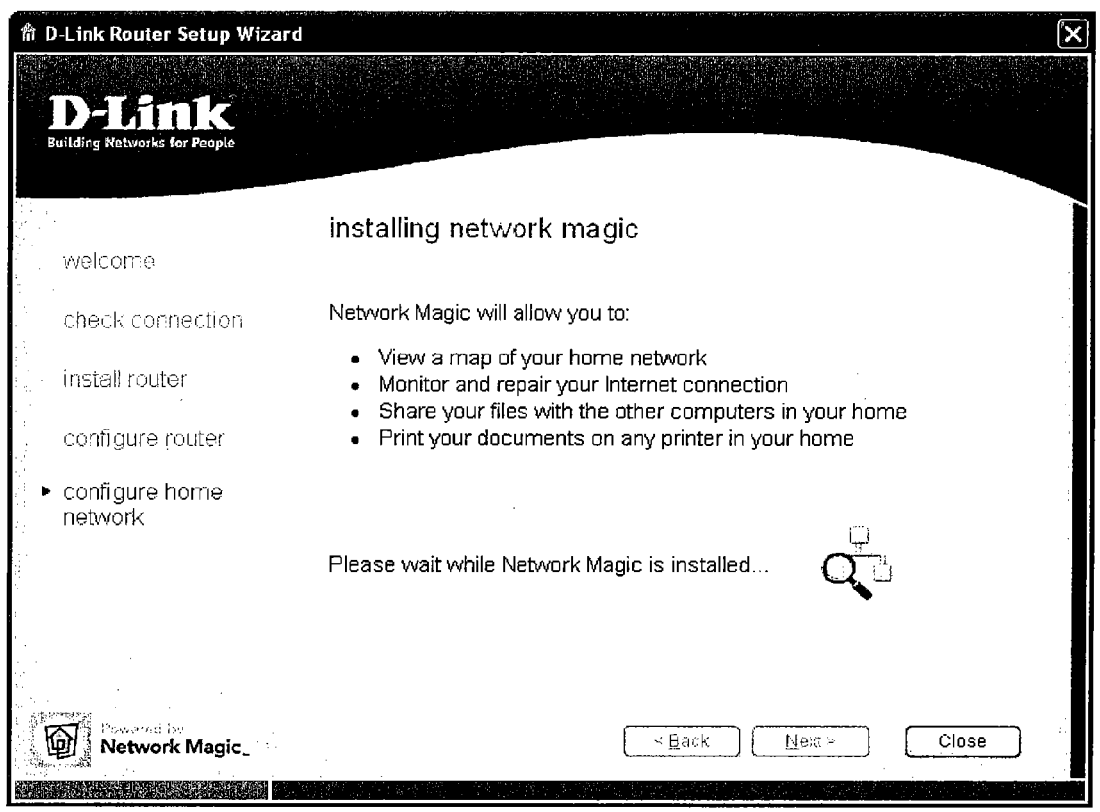
FIG. 23 shows an example installing-network-magic screen displayed in accordance embodiments of the invention.

While the network management tool is being installed, a display screen such as the one shown in FIG. 23 may be displayed.

Exit Paths

Figure 24:
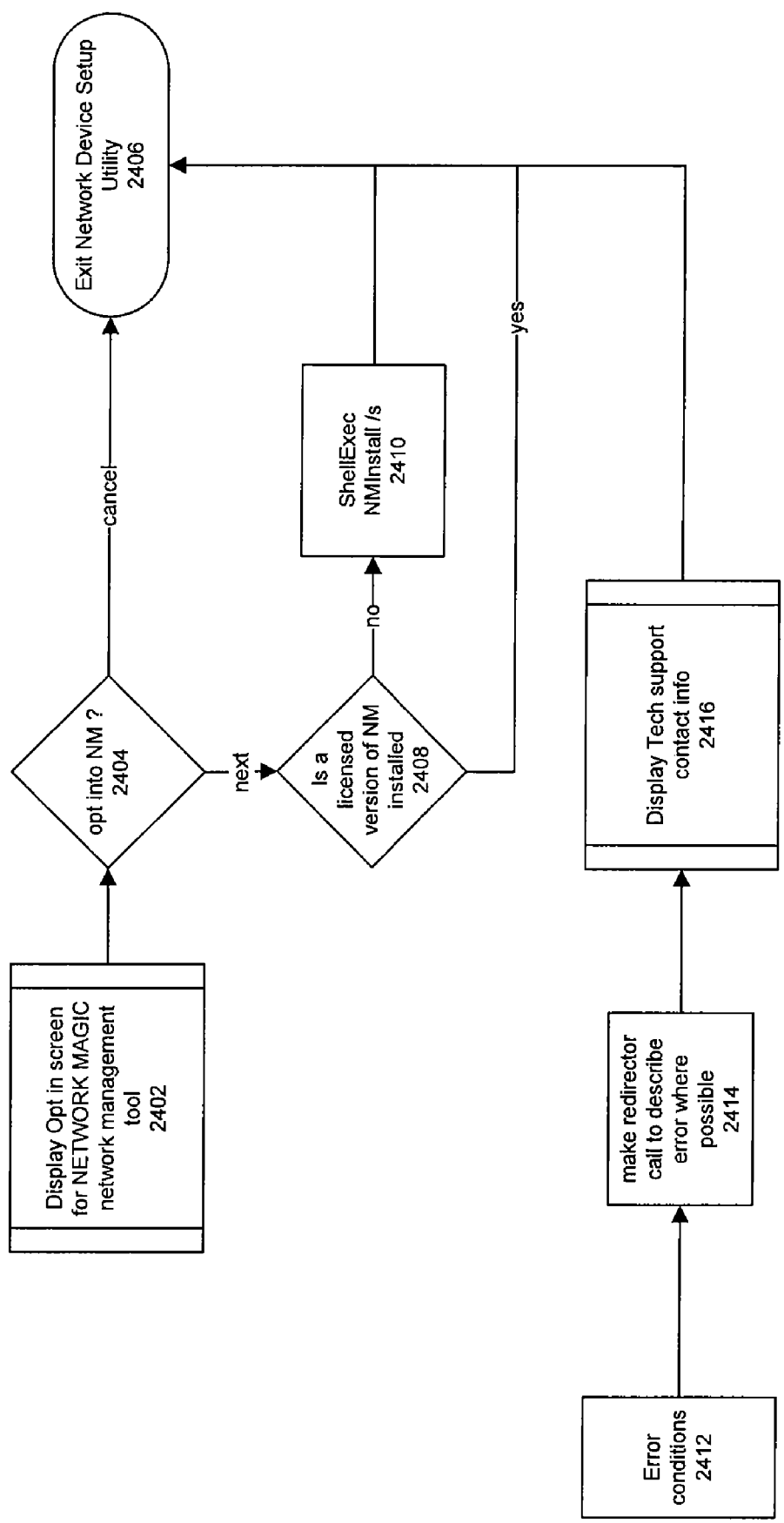
FIG. 24 is a flowchart of exit paths for a network device setup utility in accordance with embodiments of the invention.

FIG. 24 is a flowchart of exit paths for a network device setup utility in accordance with embodiments of the invention. An opt in screen, such as the one shown in FIG. 22 may be displayed, as shown at 2402. If the next button is pressed, a determination is made with respect to whether a licensed version of the NETWORK MAGIC network management tool is installed on the computing device 309. If not, a licensed version is installed as shown at 2410 and the network device setup utility 307 exits at 2406. If a licensed version is installed, then the network device setup utility 307 exits at 2406. If the cancel button is pressed from the display screen of FIG. 22, then the network device setup utility 307 exits as shown at 2404 and 2406.

When various error conditions discussed above occur, as shown at 2412, a redirector call to describe the error may be made when possible, as shown at 2414. Technical support contact information may be displayed as shown at 2416, and the network device setup utility 307 exits as shown at 2406.

Redirection Server Information

An example base URL for redirection calls is http://go.purenetworks.com/redir/click/setup. A redirection call may be made during the check current configuration step 403 to determine whether there is a later version of the network device setup utility 307. Syntax for such a redirection call may be: <base url>/start/?{pn} {sid} {a} {b} {dc} {bt} {lcid} {k} {k2} {fw} {wip}, where the parameters are described in the table below.

A redirection call may be made during the configure network device step 407 as internet connectivity verification on setup complete. Syntax for such a redirection call may be: /<base url>/complete/?{pn} {sid} {a} {b} {dc} {bt} {lcid} {f} {h1} {h2} {h3} {k} {k2} {stype} {fw} {wip}}, where the parameters are described in the table below.

| | | |
|---|---|---|
| pn | Part Number | Nmrsetup |
| a | Setup Build Number | 1.1.xxxx.0 |
| b | Setup Brand | "Pure" –> our own retail product "dlink" –> dlink branded build |
| Sid | Setup ID | Guid generated by the setup app to link start and complete calls to allow server side scripts to say "40% of 98 installs fail" etc. sid will be persisted in the registry on the local machine so that multiple attempts to run setup on one machine will all use the same sid. |
| Stype | Network configuration prior to setup being run | String value: DHCP, Static IP, Dynamic PPPoE, Static PPPoE |
| Dc | Distribution code | String stamped into the product by mktg |
| Bt | Build Type | String value, "dbg", "rel", "shp", "bta" for debug, release, ship and beta rsp. |
| Lcid | Language identifier | 1033, 1041 etc |
| F | Encrypted Router MAC == Small Network ID | |
| h1 | Router Vendor Name | <vendor_name> |
| h2 | Router Model Name | <model_name> |
| h3 | Router firmware version | HNAP <firmware - currently unspecc'd> |
| K | OS of this PC | See Product Metrics doc for format of this field |
| k2 | Memory of this PC | In Kbytes |
| Fw | Firewall Name | "Norton", "ZoneAlarm" etc as a string. Null string for no firewall |
| Wip | WAN IP address | The IP Address of the default gateway when the setup app is started. This is logged to allow us to see how many installations are behind RGs or other routers vs. direct web connections. |

The parameters h1-3 may be read from the static XML file on the installation disc for the first redirector call. The fields h2 and h3 may be updated to be the returned values from the GetDeviceSettings call for the setup/complete call.

Installation Disc Content

Figure 25:
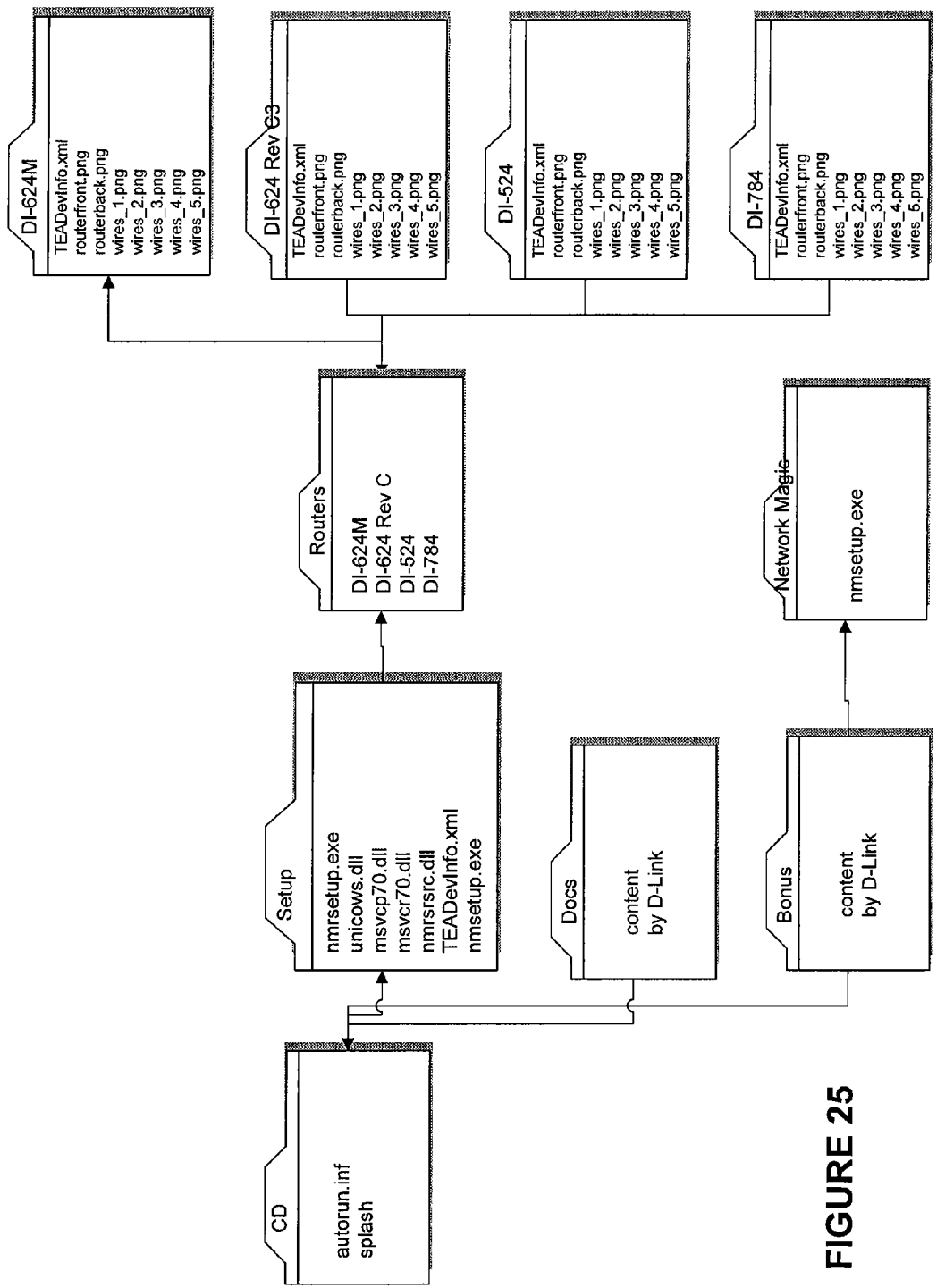
FIG. 25 shows a layout of files for an installation disc in accordance with embodiments of the invention.

FIG. 25 shows a layout of files for an installation disc in accordance with embodiments of the invention. Example contents of the XML file in accordance with embodiments of the invention are set forth below:

```
<?xml version="1.0" encoding="utf-8" ?>
 <teapi>
  <gateway>
   <subtype>GatewayWithWiFi</subtype>
   <friendly_name>D-Link DI-624</friendly_name>
   <vendor_name>D-Link</vendor_name>
   <vendor_url>http://www.dlink.com/</vendor_url>
   <model_description>AirPlus Xtreme G ® Wireless
       Router</model_description>
   <model_name>DI-624 Rev C3</model_name>
   <extensions>
    <task name="D-Link Tech Support"
       action="http://support.dlink.com/products/..." />
    <task name="Configure your wireless network"
       action="/h_wireless_11g.html" />
    <task name="Open firewall ports"
       action="/adv_virtual.html" />
    <task name="MAC address filtering"
       action="/adv_filters_mac.html" />
    <task name="Block access to specific websites"
```

-continued

```
        action="/adv_filters_url.html" />
<task name="Check for the latest firmware version"
        action="http://support.dlink.com/..." />
<task name="Upgrade Firmware"
        action="/tools_firmw.html" />
<task name="Reboot Router"
        action="/restart.cgi" />
    </extensions>
  </gateway>
</teapi>
```

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A computer-readable medium containing computer-implementable instructions for configuring a network device by a processor in an electronic environment by performing steps comprising:
gathering network configuration information at a computing device;
displaying network-device-installation instructions
configuring the network device by sending the gathered network configuration information from the computing device to the network device; and
upon determining that the network device, which is a router, is providing a valid Internet connection, comparing a model number, which is part of an authentication realm returned from the router, with a model number specified in an XML file, which is associated with a predetermined router, to determine whether the model number of the router, which is providing the valid Internet connection, is substantially the same as the model number of the predetermined router; and
upon determining that the model number of the router, which is providing the valid Internet connection, is substantially the same as the model number of the predetermined router, acknowledging that the router, which is providing the valid Internet connection, has been configured correctly by the computing device.

2. The computer-readable medium of claim 1 containing further computer-implementable instructions wherein the gathered network configuration information includes a type of Internet connection selected from the group consisting of: DHCP, static IP, dynamic PPPoE, and Static PPPoE.

3. The computer-readable medium of claim 1 containing further computer-implementable instructions wherein the gathered network configuration information includes an Internet Service Provider account name and password.

4. The computer-readable medium of claim 1 containing further computer-implementable instructions wherein the network-device-installation instructions include a graphical depiction of the network device.

5. The computer-readable medium of claim 4 containing further computer-implementable instructions wherein the graphical depiction of the network device is customizable.

6. The computer-readable medium of claim 4 containing further computer-implementable instructions wherein the network-device-installation instructions provide ordered step-by-step instructions for connecting a network cable and a power cable to the network device.

7. The computer-readable medium of claim 6 containing further computer-implementable instructions for performing steps comprising:
trying to ping the network device from the computing device;
upon determining that the computing device can not ping the network device, determining whether the network device is making DHCP REQUEST calls; and
upon determining that the network device is making DHCP REQUEST calls, instructing a user to verify that the network cable has been installed in accordance with the ordered step-by-step instructions.

8. The computer-readable medium of claim 1 containing further computer-implementable instructions wherein the network device is a router.

9. The computer-readable medium of claim 8 containing further computer-implementable instructions wherein the router is a wireless router and the gathered network configuration information includes a wireless network name and a wireless network password.

10. The computer-readable medium of claim 8 containing further computer-implementable instructions for performing steps comprising:
determining whether a default gateway Internet Protocol address is an internal address; and
upon determining that the default gateway Internet Protocol address is an internal address, displaying a prompt asking whether a user wants to replace an existing router.

11. The computer-readable medium of claim 8 containing further computer-implementable instructions for performing steps comprising:
determining whether the router is in double network-address-translation mode;
upon determining that the router is in double network-address-translation mode and that the router supports configuration in access point mode, automatically configuring the router into access point mode.

12. The computer-readable medium of claim 8 containing further computer-implementable instructions for performing steps comprising:
reporting to a metrics server that the network device setup utility is going to begin configuring the network device; and
upon successful configuration of the network device, reporting to the metrics server that the network device has been successfully configured.

13. The computer-readable medium of claim 1 containing further computer-implementable instructions wherein the network configuration information is sent in accordance with the HNAP protocol.

14. The computer-readable medium of claim 1 containing further computer-implementable instructions wherein configuring the network device includes confirming Internet connectivity.

15. A computer-implementable method of configuring a network device by a processor in an electronic environment, the method comprising:
gathering network configuration information at a computing device; displaying network-device-installation instructions
configuring the network device by sending the gathered network configuration information from the computing device to the network device; and upon determining that the network device, which is a router, is providing a valid Internet connection, comparing a model number, which is part of an authentication realm returned from the router, with a model number specified in an XML file, which is associated with a predetermined router, to determine whether the model number of the router, which is providing the valid Internet connection, is substantially the same as the model number of the predetermined router; and upon determining that the model number of the router, which is providing the valid Internet connection, is substantially the same as the model number of the predetermined router, acknowledging that the router, which is providing the valid Internet connection, has been configured correctly by the computing device.

16. The computer-implementable method of claim 15 wherein the gathered network configuration information includes a type of Internet connection selected from the group consisting of: DHCP, static IP dynamic PPPoE, and Static PPPoE.

17. The computer-implementable method of claim 15 wherein the gathered network configuration information includes an Internet Service Provider account name and password.

18. The computer-implementable method of claim 15 wherein the network-device-installation instructions include a graphical depiction of the network device.

19. The computer-implementable method of claim 18 wherein the graphical depiction of the network device is customizable.

20. The computer-implementable method of claim 18 wherein the network-device-installation instructions provide ordered step-by-step instructions for connecting a network cable and a power cable to the network device.

21. The computer-implementable method of claim 20, further comprising:
   trying to ping the network device from the computing device;
   upon determining that the computing device can not ping the network device, determining whether the network device is making DHCP REQUEST calls; and
   upon determining that the network device is making DHCP REQUEST calls, instructing a user to verify that the network cable has been installed in accordance with the ordered step-by-step instructions.

22. The computer-implementable method of claim 15 wherein the network device is a router.

23. The computer-implementable method of claim 22 wherein the router is a wireless router and the gathered network configuration information includes a wireless network name and a wireless network password.

24. The computer-implementable method of claim 22 containing further computer-implementable instructions for performing steps comprising:
   determining whether a default gateway Internet Protocol address is an internal address; and
   upon determining that the default gateway Internet Protocol address is an internal address, displaying a prompt asking whether a user wants to replace an existing router.

25. The computer-implementable method of claim 22 containing further computer-implementable instructions for performing steps comprising:
   determining whether the router is in double network-address-translation mode;
   upon determining that the router is in double network-address-translation mode and that the router supports configuration in access point mode, automatically configuring the router into access point mode.

26. The computer-implementable method of claim 22 containing further computer-implementable instructions for performing steps comprising:
   reporting to a metrics server that the network device setup utility is going to begin configuring the network device; and
   upon successful configuration of the network device, reporting to the metrics server that the network device has been successfully configured.

27. The computer-implementable method of claim 15 wherein the network configuration information is sent in accordance with the HNAP protocol.

28. The computer-implementable method of claim 15 wherein configuring the network device includes confirming Internet connectivity.

* * * * *